(12) United States Patent
Wang et al.

(10) Patent No.: US 12,512,517 B2
(45) Date of Patent: Dec. 30, 2025

(54) ELECTRODE ASSEMBLY, METHOD AND SYSTEM FOR MANUFACTURING SAME, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Hong Wang, Ningde (CN); Jiang Liu, Ningde (CN); Xiaomei Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 522 days.

(21) Appl. No.: 17/893,503

(22) Filed: Aug. 23, 2022

(65) Prior Publication Data
US 2022/0407118 A1 Dec. 22, 2022

Related U.S. Application Data

(63) Continuation of application No. PCT/CN2020/137717, filed on Dec. 18, 2020.

(51) Int. Cl.
*H01M 10/0583* (2010.01)

(52) U.S. Cl.
CPC .... *H01M 10/0583* (2013.01); *H01M 2220/20* (2013.01)

(58) Field of Classification Search
CPC ......... H01M 10/0583; H01M 10/0404; H01M 10/045; H01M 10/0459; H01M 10/052;
(Continued)

(56) References Cited

U.S. PATENT DOCUMENTS

2007/0202401 A1* 8/2007 Viavattine ......... H01M 10/0583
429/231.95
2010/0015529 A1* 1/2010 Kim .................. H01M 10/0413
429/246
(Continued)

FOREIGN PATENT DOCUMENTS

CN 101150184 A 3/2008
CN 101150185 A 3/2008
(Continued)

OTHER PUBLICATIONS

The China National Intellectual Property Administration (CNIPA) the First Office Action for Chinese Application 202080102169.1 May 18, 2024 10 Pages (With Translation).
(Continued)

*Primary Examiner* — Adam J Francis
(74) *Attorney, Agent, or Firm* — ANOVA LAW GROUP, PLLC

(57) ABSTRACT

An electrode assembly includes first and second electrode plate having opposite polarities, and a separator separating the first and second electrode plates. The first electrode plate includes two first stack sections and a bend section connecting the first stack sections and including a guide portion configured to guide the bend section to bend during production. The second electrode plate includes a second stack section disposed between the first stack sections. The separator includes two separation sections each disposed between the second stack section and one first stack section. Thickness Da of each first stack section, thickness Dc of the second stack section, and thickness Ds of each separation section in a stacking direction of the first stack sections, and a dimension w of the guide portion in a bending direction of the bend section satisfy: $Dc+2Ds \leq w \leq 2\times(Dc+2Ds+Da)$.

15 Claims, 12 Drawing Sheets

(58) Field of Classification Search
CPC ........... H01M 10/0585; H01M 50/414; H01M 50/466; H01M 50/533; H01M 50/209
See application file for complete search history.

(56) References Cited

U.S. PATENT DOCUMENTS

| | | | | |
|---|---|---|---|---|
| 2011/0104567 A1* | 5/2011 | Lee | ............ | H01M 10/125 429/211 |
| 2011/0274960 A1* | 11/2011 | Ahn | ............ | H01M 50/403 29/623.2 |
| 2012/0288747 A1* | 11/2012 | Naoi | ............ | H01G 11/12 429/163 |
| 2014/0227583 A1 | 8/2014 | Do et al. | | |
| 2015/0162638 A1* | 6/2015 | Bernini | ............ | H01M 10/0459 429/142 |
| 2018/0048013 A1* | 2/2018 | Zeng | ............ | H01M 50/461 |

FOREIGN PATENT DOCUMENTS

| | | |
|---|---|---|
| CN | 102637906 A | 8/2012 |
| CN | 103579684 A | 2/2014 |
| CN | 205828556 U | 12/2016 |
| CN | 110071331 A | 7/2019 |
| CN | 110380136 A | 10/2019 |
| EP | 1065743 A2 | 1/2001 |
| EP | 3907807 A1 | 11/2021 |
| JP | 2001028273 A | 1/2001 |
| JP | 2018045902 A | 3/2018 |
| WO | 2020003800 A1 | 1/2020 |
| WO | 2021109363 A1 | 6/2021 |

OTHER PUBLICATIONS

State Intellectual Property Office of China Notice of Grant of Invention Patent Right for Application No. 202080102169.1 Aug. 5, 2024 6 pages (including translation).

The European Patent Office (EPO) Extended Search Report for EP Application No. 20965648.7 Mar. 24 2023 10 Pages.

The World Intellectual Property Organization (WIPO) International Search Report for PCT/CN2020/137717 Jun. 25, 2021 8 pages (with translation).

* cited by examiner

ELECTRODE ASSEMBLY, METHOD AND SYSTEM FOR MANUFACTURING SAME, BATTERY CELL, BATTERY, AND ELECTRICAL DEVICE

CROSS-REFERENCE TO RELATED APPLICATION

This application is a continuation of International Application No. PCT/CN2020/137717, filed Dec. 18, 2020, the entire content of which is incorporated herein by reference.

TECHNICAL FIELD

This application relates to the technical field of batteries, and more specifically, to an electrode assembly, a method and system for manufacturing same, a battery cell, a battery, and an electrical device.

BACKGROUND

A rechargeable battery, also known as a secondary battery, is a battery that is reusable after the active material is activated by charging the battery that is discharged. Rechargeable batteries are widely used in electronic devices such as a mobile phone, a notebook computer, an electric power cart, an electric vehicle, an electric airplane, an electric ship, an electric toy car, an electric toy ship, an electric toy airplane, and a power tool.

In the development of battery technology, safety is a non-negligible issue in addition to improvement of battery performance. If the safety of the battery is not guaranteed, the battery is not suitable for use. Therefore, how to enhance the safety of the battery is an urgent technical issue in the battery technology.

SUMMARY

This application provides an electrode assembly, a method and system for manufacturing same, a battery cell, a battery, and an electrical device to reduce risks of lithium plating and enhance battery safety.

According to a first aspect, an embodiment of this application provides an electrode assembly. The electrode assembly includes: a first electrode plate, including a plurality of bend sections and a plurality of first stack sections that are stacked, where each bend section is configured to connect two adjacent first stack sections, the bend section includes a guide portion, and the guide portion is configured to guide bending of the bend section during production; a plurality of second electrode plates, where each second electrode plate is of a polarity opposite to a polarity of the first electrode plate and includes a second stack section, and the second stack section of each second electrode plate is disposed between the two adjacent first stack sections; and a separator, configured to separate the first electrode plate from the second electrode plates. The separator includes a plurality of separation sections. Each separation section is disposed between the first stack section and the second stack section that are adjacent to each other. In a stacking direction of the plurality of the first stack sections, a thickness of each first stack section is Da, a thickness of the second stack section is Dc, a thickness of each separation section is Ds, a dimension of the guide portion in a bending direction of the bend section is w, and w, Da, Dc, and Ds satisfy a relational expression: $Dc+2Ds \leq w \leq 2\times(Dc+2Ds+Da)$.

In this embodiment of this application, when the dimension w of the guide portion satisfies the relational expression $Dc+2Ds \leq w \leq 2\times(Dc+2Ds+Da)$, the guide portion can guide the first electrode plate to bend in a preset region, thereby improving controllability and accuracy of a bend position, making the first electrode plate and the second electrode plate less prone to deviate from the preset positions, and suppressing lithium plating. In addition, the guide portion can reduce stress concentration of a first active material layer on the bend section, provide enough space for the second stack section and the separator, reduce an extrusion force exerted by the bend section on the second stack section and the separator, and suppress detachment of coating.

In some embodiments, the guide portion is disposed along a first direction. The first direction is perpendicular to the bending direction of the bend section.

In some embodiments, the guide portion includes at least one hole. The hole can reduce strength of the bend section and make the bend section more bendable. With the hole provided, at least a part of the first active material layer on the bend section is removed, so as to reduce the stress concentration of the first active material layer on the bend section, provide space for the second stack section and the separator, reduce the extrusion force exerted by the bend section on the second stack section and the separator, and suppress detachment of coating.

In some embodiments, the hole runs through the bend section. The hole may be formed by die-cutting the first electrode plate, so that the forming process is simple. In addition, the hole that is through can reduce a weight of the electrode assembly and increase an energy density of the electrode assembly. An electrolytic solution may run through the hole to infiltrate the second electrode plate, thereby improving effects of infiltrating the electrode assembly.

In some embodiments, the bend section includes a plurality of bend sub-sections. The bend sub-sections and the hole are disposed alternately along the first direction. By increasing the number of bend sub-sections, the dimension of the bend sub-sections along the first direction can be reduced, and each bend sub-section is more bendable, thereby helping to guide the folding of the first electrode plate.

In some embodiments, a dimension of the hole along the first direction is L1, a dimension of the bend sub-section along the first direction is L2, and $2 \leq L1/L2 \leq 40$. In this way, the bending effect of the bend sub-section can be improved on the basis of avoiding breakage of the bend sub-section.

In some embodiments, the guide portion includes a plurality of holes. The plurality of holes are spaced out.

In some embodiments, the plurality of holes are spaced out along the first direction. With the number of holes increased, the number of the bend sub-sections is increased accordingly, the dimension of the bend sub-sections along the first direction is reduced, and each bend sub-section is more bendable, thereby helping to guide the folding of the first electrode plate.

In some embodiments, the hole is in a circular, elliptical, racetrack, or polygonal shape. Optionally, corners of the polygonal hole are rounded. The rounded corners smoothens the corners of the polygonal hole, and can reduce burrs on the first electrode plate during formation of the hole.

In some embodiments, a dimension of the guide portion along the first direction is L3, a dimension of the bend section along the first direction is L4, and $0.5 \leq L3/L4 \leq 0.99$. In this way, the bending effect of the bend section and the guidance effect of the guide portion can be improved on the basis of reducing risks of breaking the bend section.

In some embodiments, the dimension L4 of the bend section along the first direction is 200 mm to 1200 mm. When the dimension L4 of the bend section is 200 mm to 1200 mm, the bending effect of the bend section is better.

In some embodiments, the plurality of the bend sections include a first bend section and a second bend section. The first bend section and the second bend section are connected to two ends of the first stack section along a second direction respectively. A spacing L5 between the guide portion on the first bend section and the guide portion on the second bend section along the second direction is 80 mm to 200 mm. The second direction is perpendicular to the first direction and the stacking direction. The value of L5 falling within 80 mm to 200 mm can improve the forming effect of the electrode assembly.

In some embodiments, the first electrode plate is a negative electrode plate, and the second electrode plate is a positive electrode plate. The first active material layer of the bend section can provide a lithium intercalation space for lithium ions, thereby reducing risks of lithium plating.

In some embodiments, the first electrode plate includes a first current collector and a first active material layer disposed at a surface of the first current collector. The second electrode plate includes a second current collector and a second active material layer disposed at a surface of the second current collector. In the stacking direction, the first active material layer of the first stack section fully covers the second active material layer of the second stack section. The first active material layer of the first stack section can provide a lithium intercalation space for the lithium ions deintercalated from the second active material layer, thereby suppressing lithium plating.

In some embodiments, in a direction perpendicular to the stacking direction, the first active material layer of the first stack section exceeds the second active material layer of the second stack section by at least 0.1 mm. The first active material layer of the first stack section can provide a sufficient lithium intercalation space for the lithium ions deintercalated from the second active material layer, thereby suppressing lithium plating.

In some embodiments, each first stack section includes two opposite first edges. After the bend section is bent as guided during production, the first edges of the two adjacent first stack sections connected to the bend section are consistent.

According to a second aspect, an embodiment of this application provides a battery cell, including: a housing, provided with an accommodation cavity and an opening; at least one electrode assembly according to the first aspect, where the electrode assembly is accommodated in the accommodation cavity; and a cover plate, configured to close the opening of the housing.

According to a third aspect, an embodiment of this application provides a battery, including: a box; and at least one battery cell according to the second aspect. The battery cell is accommodated in the box.

According to a fourth aspect, an embodiment of this application provides an electrical device. The electrical device is configured to receive electrical energy provided by the battery according to the third aspect.

According to a fifth aspect, an embodiment of this application provides a method for manufacturing an electrode assembly. The method includes: providing a first electrode plate, where the first electrode plate includes a plurality of bend sections and a plurality of first stack sections, each bend section is configured to connect two adjacent first stack sections, the bend section includes a guide portion, and the guide portion is configured to guide bending of the bend section during production; providing separators, and fixing the separators onto two surfaces of the first electrode plate respectively, where each separator includes a plurality of separation sections; providing a plurality of second electrode plates, where each second electrode plate is of a polarity opposite to a polarity of the first electrode plate and includes a second stack section, and fixing each of the second electrode plates onto a surface that is of the separator and that faces away from the first electrode plate; and bending the bend section under guidance of the guide portion, so that: the plurality of first stack sections are stacked, the second stack section of each second electrode plate is disposed between two adjacent first stack sections, and each separation section is disposed between the first stack section and the second stack section that are adjacent. In a stacking direction of the plurality of the first stack sections, a thickness of each first stack section is Da, a thickness of the second stack section is Dc, a thickness of each separation section is Ds, a dimension of the guide portion in a bending direction of the bend section is w, and w, Da, Dc, and Ds satisfy a relational expression: $Dc+2Ds \leq w \leq 2 \times (Dc+2Ds+Da)$.

According to a sixth aspect, an embodiment of this application provides a system for manufacturing an electrode assembly. The system includes: a first providing device, configured to provide a first electrode plate, where the first electrode plate includes a plurality of bend sections and a plurality of first stack sections, each bend section is configured to connect two adjacent first stack sections, the bend section includes a guide portion, and the guide portion is configured to guide bending of the bend section during production; a second providing device, configured to provide separators, where each separator includes a plurality of separation sections; a first assembling device, configured to fix the separators onto two surfaces of the first electrode plate respectively; a third providing device, configured to provide a plurality of second electrode plates, where each second electrode plate is of a polarity opposite to a polarity of the first electrode plate and includes a second stack section; a second assembling device, configured to fix each of the second electrode plates onto a surface that is of the separator and that faces away from the first electrode plate; and a third assembling device, configured to bend the bend section under guidance of the guide portion, so that: the plurality of first stack sections are stacked, the second stack section of each second electrode plate is disposed between two adjacent first stack sections, and each separation section is disposed between the first stack section and the second stack section that are adjacent. In a stacking direction of the plurality of the first stack sections, a thickness of each first stack section is Da, a thickness of the second stack section is Dc, a thickness of each separation section is Ds, a dimension of the guide portion in a bending direction of the bend section is w, and w, Da, Dc, and Ds satisfy a relational expression: $Dc+2Ds \leq w \leq 2 \times (Dc+2Ds+Da)$.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
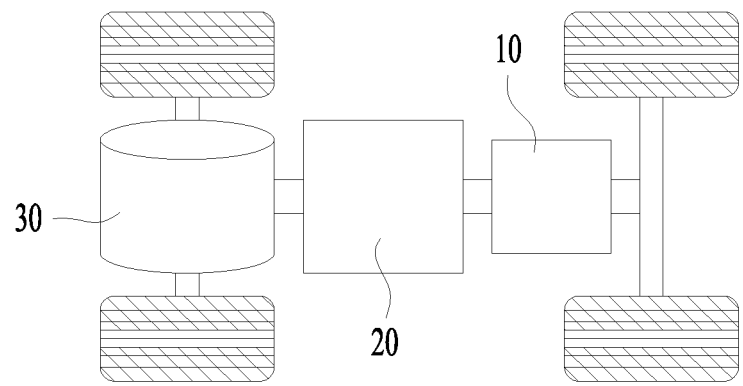
FIG. 1 is a schematic structural diagram of a vehicle according to an embodiment of this application.

The drawings are not necessarily drawn to scale.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings of this application are intended to distinguish different objects, but are not intended to describe a specific sequence or order of priority.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related objects, and represents three possible relationships. For example, "A and/or B" may represent the following three circumstances: A alone, both A and B, and B alone. In addition, the character "/" herein generally indicates an "or" relationship between the object preceding the character and the object following the character.

"A plurality of" referred to in this application means two or more (including two). Similarly, "a plurality of groups" means two or more groups (including two groups), and "a plurality of pieces" means two or more pieces (including two pieces).

In this application, the term "parallel" includes not only a scenario of being absolutely parallel, but also a scenario of being approximately parallel according to conventional knowledge of engineering. Also, the term "perpendicular" includes not only a scenario of being absolutely perpendicular, but also a scenario of being approximately perpendicular according to conventional knowledge of engineering.

In this application, a battery cell may include a lithium-ion secondary battery, a lithium-ion primary battery, a lithium-sulfur battery, a sodium-lithium-ion battery, a sodium-ion battery, a magnesium-ion battery, or the like. The embodiments of this application do not limit the type of the battery cell. The battery cell may be in a cylindrical shape, a flat shape, a cuboidal shape, or other shapes. The embodiments of this application do not limit the shape of the battery cell. Depending on the form of packaging, the battery cell is typically classed into three types: cylindrical battery cell, prismatic battery cell, and pouch-type battery cell. The embodiments of this application do not limit the form of the battery cell.

The battery mentioned in the embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharge of the battery cells.

A battery cell includes an electrode assembly and an electrolytic solution. The electrode assembly includes a positive electrode plate, a negative electrode plate, and a separator. The battery cell works primarily by relying on movement of metal ions between the positive electrode plate and the negative electrode plate. The positive electrode plate includes a positive current collector and a positive active material layer. The positive active material layer is coated on a surface of the positive current collector. A part that is of the current collector and that is not coated with the positive active material layer protrudes from a part that is of the current collector and that is coated with the positive active material layer. The part that is of the current collector and that is not coated with the positive active material layer serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. A part that is of the current collector and that is not coated with the negative active material layer protrudes from a part that is of the current collector and that is coated with the negative active material layer. The part that is of the current collector and that is not coated with the negative active material layer serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. A separator includes a large number of micropores that run through the separator. The micropores ensure free passage of electrolyte ions, and are well permeable to lithium ions. The separator may be made of polypropylene (PP), polyethylene (PE), or another material. The development of the battery technology needs to allow for a plurality of design factors, including performance parameters such as energy density, cycle life, discharge capacity, charge rate, and discharge rate, and also needs to consider the safety of the battery.

During charging of a lithium-ion battery, lithium ions are deintercalated from the positive electrode plate and intercalated into the negative electrode plate. However, some abnormal conditions may occur, for example, the space for lithium intercalation in the negative electrode is insufficient, the resistance to intercalation of the lithium ions into the negative electrode is excessive, or the lithium ions are prematurely deintercalated from the positive electrode, and the de-intercalated lithium ions are unable to be intercalated into the negative active material layer of the negative electrode plate in an equal amount. The lithium ions that are unable to be intercalated into the negative electrode plate have to gain electrons from the surface of the negative electrode, thereby forming silver-white metal lithium simple substance, which is a phenomenon of lithium plating. Lithium plating not only deteriorates the performance of a lithium-ion battery and greatly shortens a cycle life, but also limits a fast-charge capacity of the lithium-ion battery. In addition, when the lithium plating occurs in a lithium-ion battery, the precipitated lithium metal is very active, and can react with the electrolytic solution even at a relatively low temperature. Consequently, a starting temperature ($T_{onset}$) of self-heating of the battery is lowered, and the self-heating speed increases, thereby severely impairing safety of the battery. Further, when the lithium plating is severe, the deintercalated lithium ions may form lithium dendrites on the surface of the negative electrode. The lithium dendrites are prone to pierce the separator, resulting in risks of a short circuit between the positive electrode plate and the negative electrode plate that are adjacent to each other.

After noticing the problem of poor electrochemical performance of existing battery cells, the inventor finds that a reason for the problem is that at least one of the positive electrode plate or the negative electrode plate in the formed electrode assembly deviates from a preset position. The deviation affects the electrochemical performance of the electrode assembly. The inventor further finds that at least one of the positive electrode plate or the negative electrode plate in the formed electrode assembly deviates from the preset position, resulting in a phenomenon of lithium plating of the electrode assembly and affecting the electrochemical performance of the secondary battery. A possible reason is that the negative active material layer is unable to fully cover the positive active material layer, so that the deintercalated lithium ions are unable to be intercalated into the negative active material layer of the negative electrode plate in an equal amount.

In view of this, this application intends to provide an electrode assembly. The electrode assembly makes a positive electrode plate and a negative electrode plate stay at preset positions, thereby reducing risks of lithium plating, ensuring high electrochemical performance of the electrode assembly, and improving safety of the battery.

All technical solutions described in the embodiments of this application are applicable to various battery-powered devices such as a mobile phone, a portable device, a laptop computer, an electric power cart, an electrical toy, a power tool, an electric vehicle, a ship, and a spacecraft. The spacecraft includes, for example, an airplane, a rocket, a space shuttle, and a spaceship.

Understandably, the technical solutions described in the embodiments of this application are not only applicable to the devices described above, but also applicable to all battery-powered devices. However, for brevity, the following embodiments are described by using an electric vehicle as an example.

For example, as shown in FIG. 1, which is a schematic structural diagram of a vehicle 1 according to an embodiment of this application, the vehicle 1 may be an oil-fueled vehicle, a natural gas vehicle, or a new energy vehicle. The new energy vehicle may be a battery electric vehicle, a hybrid electric vehicle, a range-extended electric vehicle, or the like. A battery 10, a controller 20, and a motor 30 may be disposed inside the vehicle 1. The controller 20 is configured to control the battery 10 to supply power to the motor 30. For example, the battery 10 may be disposed at the bottom, front, or rear of the vehicle 1. The battery 10 may be configured to supply power to the vehicle 1. For example, the battery 10 may serve as an operating power supply of the vehicle 1 to power a circuit system of the vehicle 1. For example, the battery may be configured to meet operating power usage requirements of the vehicle 1 that is being started, navigated, or running. In another embodiment of this application, the battery 10 serves not only as an operating power supply of the vehicle 1, but may also serve as a drive power supply of the vehicle 1 to provide driving motive power for the vehicle 1 in place of or partially in place of oil or natural gas.

To meet different power usage requirements, the battery 10 may include a plurality of battery cells. The plurality of battery cells may be connected in series, in parallel, or in both series and parallel. The connecting in both series and parallel means a combination of series connection and parallel connection. The battery 10 may also be referred to as a battery pack. Optionally, the plurality of battery cells may be connected in series, in parallel, or in both series and in parallel to form a battery module, and then a plurality of battery modules may be connected in series, in parallel, or in both series and parallel to form the battery 10. In other words, the plurality of battery cells may directly form the battery 10, or form the battery modules that are then used to form the battery 10.

Figure 2:
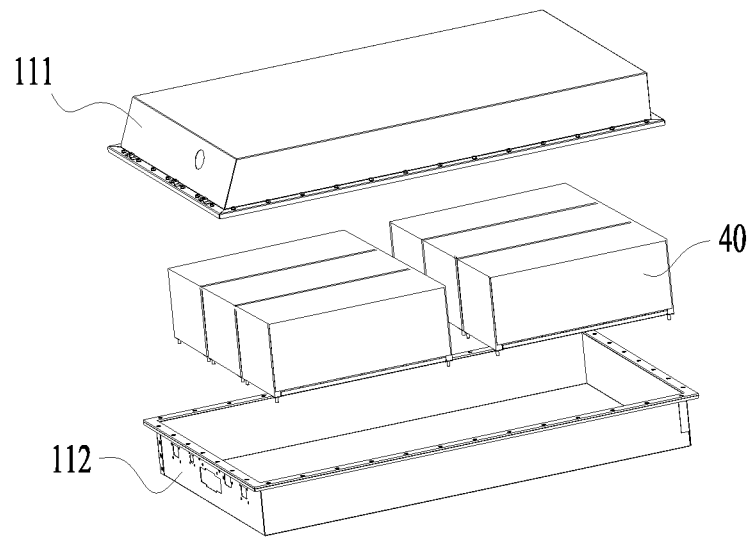
FIG. 2 is a schematic structural diagram of a battery according to an embodiment of this application.

For example, as shown in FIG. 2, which is a schematic structural diagram of a battery 10 according to an embodiment of this application, the battery 10 may include a plurality of battery cells 40. The battery 10 may further include a box (or referred to as a container). The interior of the box is a hollow structure. A plurality of battery cells 40 are accommodated in the box. As shown in FIG. 2, the box may include two parts, herein referred to as a first part 111 and a second part 112 respectively. The first part 111 and the second part 112 are snap-fitted together. The shapes of the first part 111 and the second part 112 may be determined depending on the shape of a combination of the plurality of battery cells 40. The first part 111 and the second part 112 each may be provided with an opening. For example, both the first part 111 and the second part 112 are a hollow cuboid, and each includes only one surface that is opened. The opening of the first part 111 is disposed opposite to the opening of the second part 112. The first part 111 is snap-fitted to the second part 112 to form a box with a closed chamber. The plurality of battery cells 40 are combined and connected in parallel or in series or in both series and parallel, and then placed into the box that is formed by snap-fitting the first part 111 and the second part 112.

Optionally, the battery 10 may further include other structures, details of which are omitted here. For example, the battery 10 may further include a busbar component. The busbar component is configured to implement electrical connection between the plurality of battery cells 40, such as parallel connection, series connection, or series-parallel connection. Specifically, the busbar component may implement the electrical connection between the battery cells 40 by connecting electrode terminals of the battery cells 40. Further, the busbar component may be fixed to the electrode terminals of the battery cells 40 by welding. Electrical energy of the plurality of battery cells 40 may be further led out by a conductive mechanism running through the box. Optionally, the conductive mechanism may also belong to the busbar component.

Figure 3:
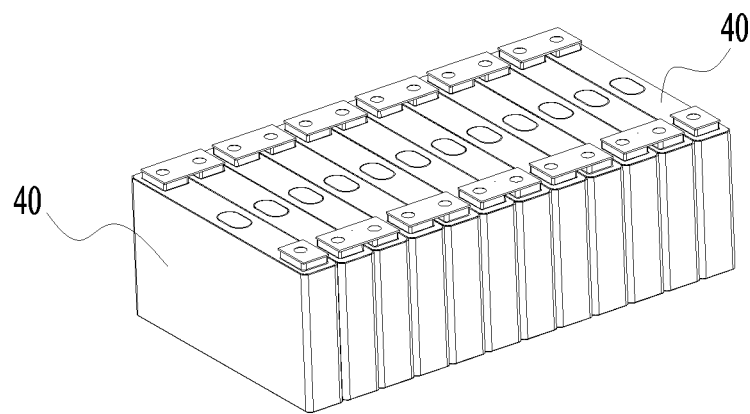
FIG. 3 is a schematic structural diagram of a battery module according to an embodiment of this application.

Depending on different power requirements, the number of battery cells 40 may be set to any value. A plurality of battery cells 40 may be connected in series, in parallel, or in both series and parallel to achieve a relatively high capacity or power. Each battery 10 may include a relatively large number of battery cells 40. Therefore, in order to facilitate mounting, the battery cells 40 may be arranged in groups. Each group of battery cells 40 forms a battery module. The number of battery cells 40 included in the battery module is not limited, and may be set as required. For example, FIG. 3 shows an example of a battery module. The battery 10 may include a plurality of battery modules. The battery modules may be connected in series, in parallel, or in both series and parallel.

Figure 4:
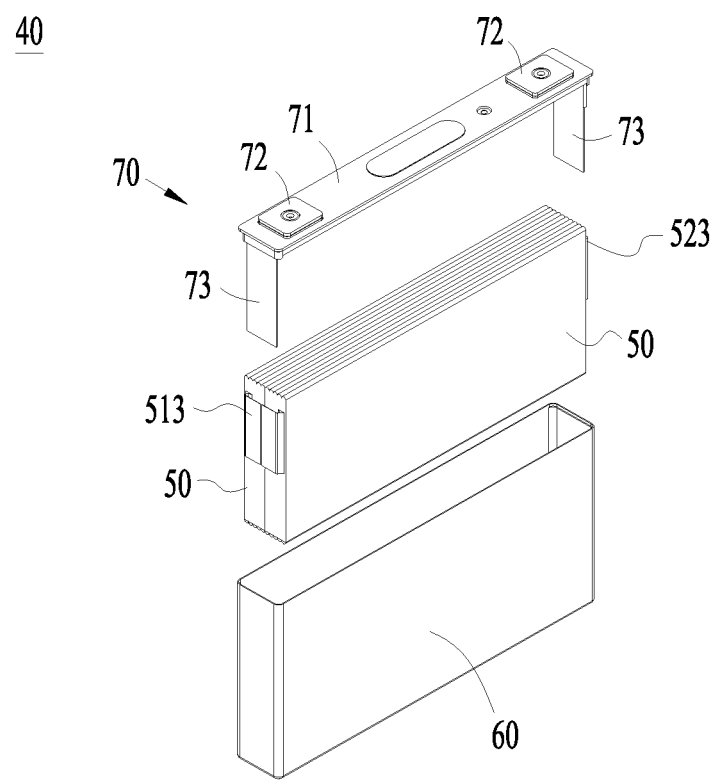
FIG. 4 is a schematic structural diagram of a battery cell according to an embodiment of this application.

Refer to FIG. 4, which is a schematic structural diagram of a battery cell 40 according to an embodiment of this application. The battery cell 40 according to this embodiment of this application includes an electrode assembly 50, a housing 60, and an end cap assembly 70. The housing 60 is provided with an accommodation cavity and an opening. The electrode assembly 50 is accommodated in the accommodation cavity. The shape of the housing 60 is determined depending on the shape of a combination of one or more electrode assemblies 50. For example, the housing 60 may be a hollow cuboid or cube or cylinder. One surface of the housing 60 is provided with an opening through which one or more electrode assemblies 50 can be placed into the housing 60 conveniently. For example, when the housing 60 is a hollow cuboid or cube, one of faces of the housing 60 is an opened face. The opened face is not walled so that the inside of the housing 60 communicates with the outside. The end cap assembly 70 includes a cover plate 71. The cover plate 71 covers the opening and is connected to the housing 60, so as to close the opening of the housing 60 and place the electrode assembly 50 in the closed cavity. The housing 60 is filled with an electrolyte such as an electrolytic solution.

The end cap assembly 70 may further include two electrode terminals 72. The two electrode terminals 72 may be disposed at the cover plate 71. The cover plate 71 is generally in the shape of a flat plate, and two electrode terminals 72 are fixed on a flat surface of the cover plate 71. The two electrode terminals 72 are a positive electrode terminal and a negative electrode terminal respectively. A connecting member 73, also referred to as a current collecting member, is disposed corresponding to each electrode terminal 72, and is configured to electrically connect the electrode assembly 50 and the electrode terminal 72.

Each electrode assembly 50 includes a first tab 513 and a second tab 523. The polarity of the first tab 513 is opposite to the polarity of the second tab 523. For example, when the first tab 513 is a positive tab, the second tab 523 is a negative tab. The first tabs 513 of one or more electrode assemblies 50 are connected to one electrode terminal 72 by one connecting member 73, and the second tabs 523 of one or more electrode assemblies 50 are connected to another electrode terminal 72 by another connecting member 73. For example, the positive electrode terminal is connected to the positive tab by one connecting member 73, and the negative electrode terminal is connected to the negative tab by another connecting member 73.

In the battery cell 40, one or more electrode assembly 50 may be disposed according to actual use requirements.

Figure 5:
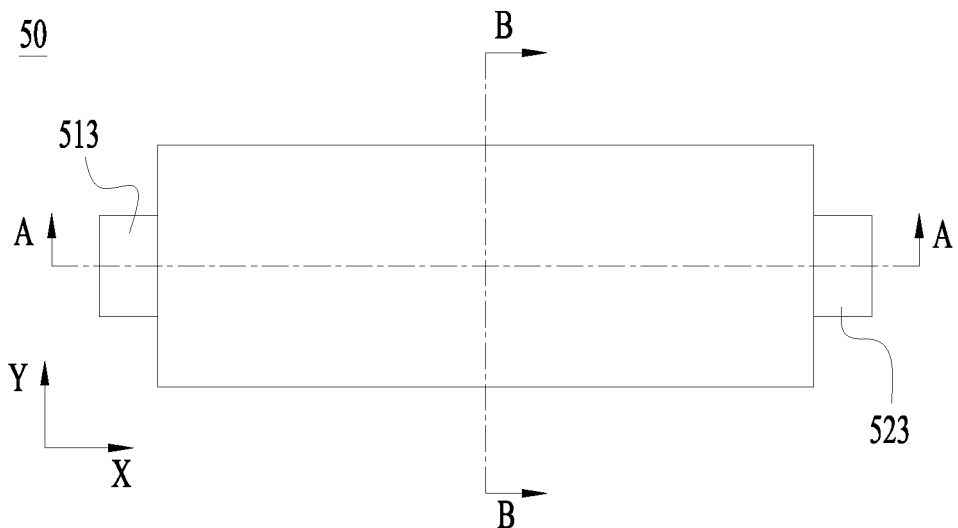
FIG. 5 is a schematic front view of an electrode assembly according to an embodiment of this application.
Figure 6:
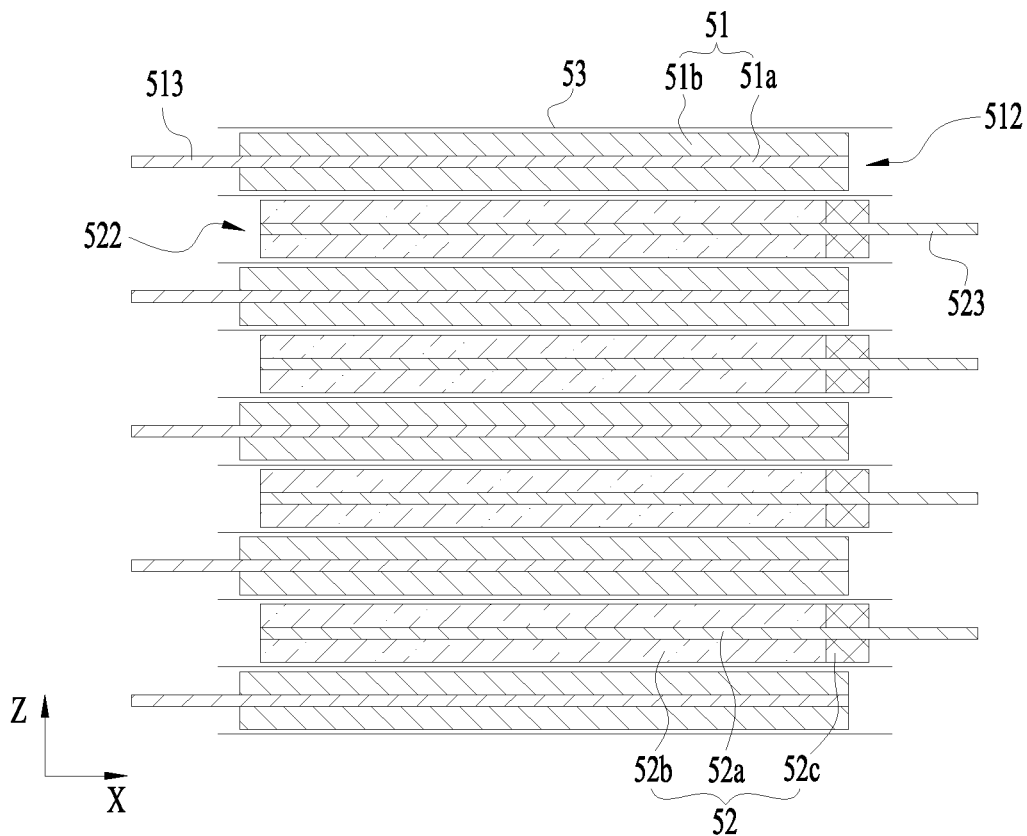
FIG. 6 is schematic sectional view of the electrode assembly shown in FIG. 5 and sectioned along an A-A line.
Figure 7:
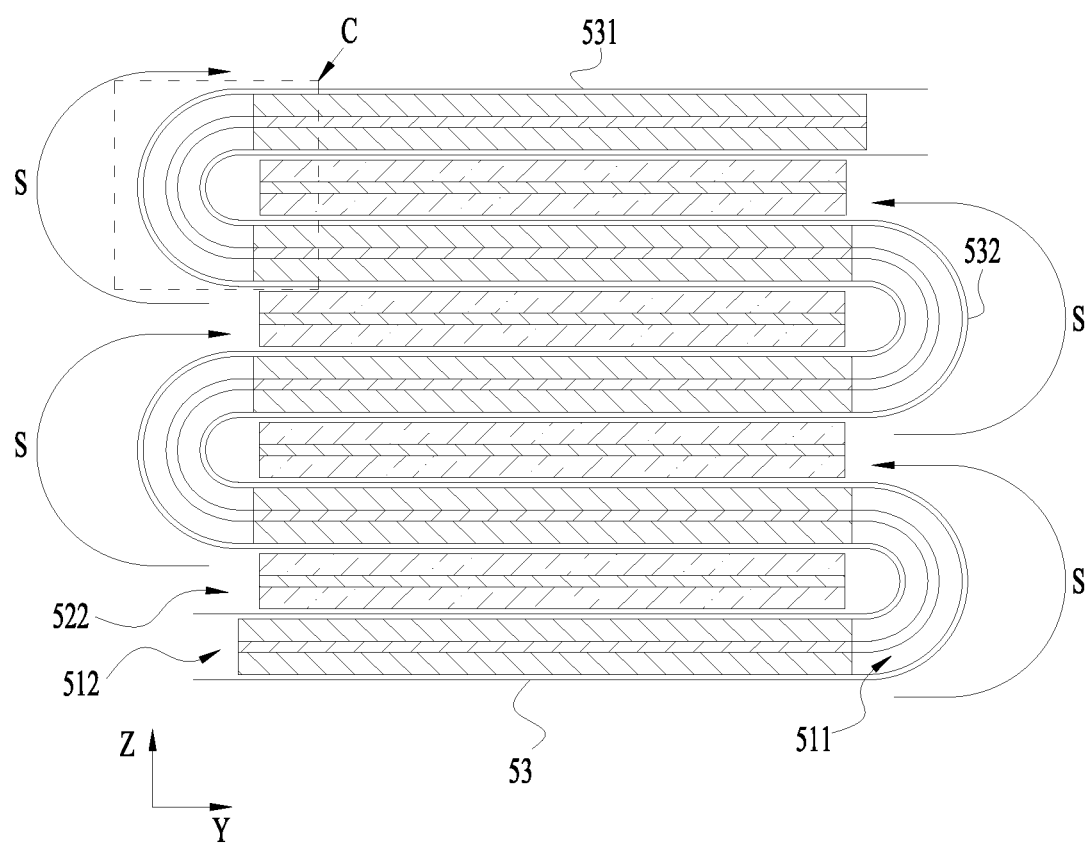
FIG. 7 is schematic sectional view of the electrode assembly shown in FIG. 5 and sectioned along a B-B line.
Figure 8:
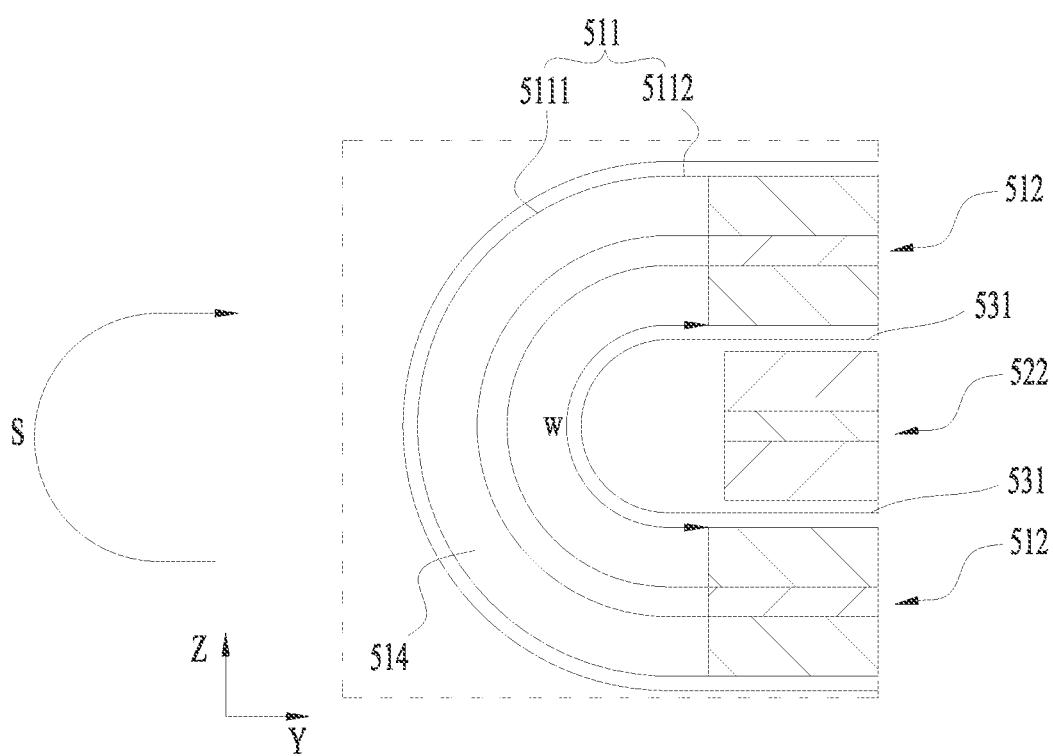
FIG. 8 is an enlarged schematic view of a region C of the electrode assembly shown in FIG. 6.

FIG. 5 is a schematic front view of an electrode assembly 50 according to an embodiment of this application; FIG. 6 is schematic sectional view of the electrode assembly 50 shown in FIG. 5 and sectioned along an A-A line; FIG. 7 is schematic sectional view of the electrode assembly 50 shown in FIG. 5 and sectioned along a B-B line; and FIG. 8 is an enlarged schematic view of a region C of the electrode assembly 50 shown in FIG. 6.

Referring to FIG. 5 to FIG. 8, the electrode assembly 50 according to this embodiment of this application includes a first electrode plate 51, a second electrode plate 52, and a separator 53. The separator 53 is configured to separate the first electrode plate 51 from the second electrode plate 52. The polarity of the second electrode plate 52 is opposite to the polarity of the first electrode plate 51. For example, when the first electrode plate 51 is a negative electrode plate, the second electrode plate 52 is a positive electrode plate; and, when the first electrode plate 51 is a positive electrode plate, the second electrode plate 52 is a negative electrode plate.

The first electrode plate 51 includes a first current collector 51a and a first active material layer 51b coated on a surface of the first current collector 51a. The first current collector 51a includes a first coating region and a first protruding region. The first coating region is coated with the first active material layer 51b. The first protruding region protrudes from the first coating region, and at least a part of the first protruding region is not coated with the first active material layer 51b. A part that is of the first protruding region and that is not coated with the first active material layer 51b is configured to connect to the connecting member 73. That is, the first protruding region serves as the first tab 513.

The second electrode plate 52 includes a second current collector 52a and a second active material layer 52b coated on a surface of the second current collector 52a. The second current collector 52a includes a second coating region and a second protruding region. The second coating region is coated with the second active material layer 52b. The second protruding region protrudes from the second coating region, and at least a part of the second protruding region is not coated with the second active material layer 52b. A part that is of the second protruding region and that is not coated with the second active material layer 52b is configured to connect to the connecting member 73. That is, the second protruding region serves as the second tab 523.

The first tab 513 and the second tab 523 are generally formed by a cutting process. In some embodiments, the second electrode plate 52 further includes a protective coating 52c. The protective coating 52c is coated on a surface of the second current collector 52a and is connected to the second active material layer 52b. The protective coating 52c is located on a side that is of the second active material layer 52b and that is close to the second protruding region. One part of the protective coating 52c is coated on the second coating region, and the other part of the protective coating 52c is coated on the second protruding region. A region that is of the second protruding region and that is not covered by the protective coating 52c is configured to connect to the connecting member 73. The protective coating 52c can reduce burrs at a cutting position during a cutting process of the second tab 523.

The first electrode plate 51 includes a plurality of bend sections 511 and a plurality of first stack sections 512 that are stacked. Each bend section 511 is configured to connect two adjacent first stack sections 512. In this embodiment, the first electrode plate 51 is a continuous extending structure as a whole, and is iteratively bent in approximately a zigzag shape. The plurality of first stack sections 512 are sequentially stacked along a stacking direction Z.

In the electrode assembly 50, the bend section 511 is at least partly in a bent state. In some examples, the bend section 511 is in a bent state as a whole, and the bend section 511 is approximately in an arc shape such as a circular arc shape. In other examples, the bend section 511 is just partly in the bent state. Specifically, the bend section 511 includes an arc region 5111 and a straight region 5112. The arc region 5111 is bent into an arc shape as a whole such as a circular arc shape. The straight region 5112 is in a flat plate shape, and is connected to the arc region 5111 and the first stack section 512.

In some embodiments, the first stack section 512 is in a flat plate shape as a whole and is perpendicular to the stacking direction Z. In other embodiments, an end that is of the first stack section 512 and that is connected to the bend section 511 may also be in a bent state.

A plurality of second electrode plates 52 are disposed. Each second electrode plate 52 includes a second stack section 522. The second stack section 522 of each second electrode plate 52 is disposed between the two adjacent first stack sections 512. The plurality of second electrode plates 52 are separated from each other. The second stack section 522 is approximately in a flat plate shape and perpendicular to the stacking direction Z. The stacking direction Z is parallel to a thickness direction of the first stack section 512 and a thickness direction of the second stack section 522.

The separator 53 includes a plurality of separation sections 531. Each separation section 531 is disposed between the first stack section 512 and the second stack section 522 that are adjacent to each other. The separation section 531 can dielectrically separate the first stack section 512 from the second stack section 522 that are adjacent to each other, so as to reduce short-circuit risks. The separation section 531 is parallel to the first stack section 512 and the second stack section 522. The thickness direction of the separation section 531 is parallel to the stacking direction Z. In some embodiments, the separator 53 further includes a connecting section 532 disposed at an inner side and an outer side of each bend section 511 separately. The connecting section 532 is configured to connect two separation sections 531. The connecting section 532 can dielectrically separate the bend section 511 from the second stack section 522 to reduce short-circuit risks. Optionally, there are two separators 53. The separators 53 are iteratively bent in a zigzag shape to form the separation section 531 and the connecting section 532.

The first tab 513 extends from an edge of the first stack section 512, and the second tab 523 extends from an edge of the second stack section 522. In some examples, the number of the first tabs 513 is the same as the number of the first stack sections 512, and the first tabs 513 are disposed in one-to-one correspondence to the first stack sections 512. The number of the second tabs 523 is the same as the number of the second stack sections 522, and the second tabs 523 are disposed in one-to-one correspondence to the second stack sections 522.

By analyzing a forming process of the electrode assembly and further studying the phenomenon of lithium plating, the inventor finds that, when the first electrode plate is a continuous structure as a whole, it is difficult to bend the electrode plate along a preset region in a bending process. Consequently, after the first electrode plate and the second electrode plate are stacked to form an electrode assembly, the negative active material layer may be unable to fully cover the positive active material layer, and the electrode assembly is prone to lithium plating, thereby affecting the electrochemical performance and safety performance of the secondary battery. In addition, when the first electrode plate is bent, stress concentration occurs on the first active material layer on the bend section, resulting in detachment of an active material, which is referred to as detachment of coating. The space between a bend section and a second stack section is limited. Therefore, it is possible that the bend section squeezes an edge of the second stack section, also resulting in detachment of the second active material layer from the second stack section. In addition, the bend section may squeeze the separator, resulting in wrinkling of the separator between the bend section and the second stack section.

In view of the above problems found by the inventor, the inventor makes improvements to the structure of the first electrode plate.

Specifically, in some embodiments, the bend section 511 includes a guide portion 514. The guide portion 514 is configured to guide the bend section 511 to bend during production. In a production process of the electrode assembly 50, when an external force is exerted on the first electrode plate 51 to bend the first electrode plate 51, the guide portion 514 can guide the first electrode plate 51 to bend in a preset region to form the bend section 511, thereby helping to improve the controllability and accuracy of a bend position. This makes the first electrode plate 51 and the second electrode plate 52 less prone to deviate from the preset positions, reduces the possibility that the negative active material layer in the first stack section 512 and the second stack section 522 is unable to fully cover the positive active material layer, suppresses lithium plating, and improves the electrochemical performance of the electrode assembly 50.

In some embodiments, the number of the guide portions 514 may be the same as the number of the bend sections 511, and the guide portions 514 are disposed in one-to-one correspondence to the bend sections 511. Certainly, in some other embodiments, among all bend sections 511, some bend sections 511 are provided with the guide portion 514, but other bend sections 511 may be not provided with the guide portion 514.

The guide portion 514 may be a trace of things left. Optionally, the guide portion 514 may mean a structure formed by removing a part of the first active material layer 51b from the first electrode plate 51 by using a material remover; or, the guide portion 514 may mean a structure formed by removing a part of the first active material layer 51b and a part of the first current collector 51a from the first electrode plate 51 by using a material remover. The guide portion 514 disposed can reduce the strength of the bend section 511 and make the bend section 511 more bendable. The first active material layer 51b is brittle to some extent, and the coating of the active material is prone to be detached due to stress concentration during the bending. With the guide portion 514 disposed at the bend section 511, a part of the first active material layer 51b can be removed from the bend section 511 to reduce the stress concentration of the first active material layer 51b on the bend section 511. In addition, with the guide portion 514 disposed at the bend section 511, a space is provided for the second stack section 522 and the separator 53 to reduce the extrusion force exerted by the bend section 511 on the second stack section 522 and the separator 53 and suppress the detachment of coating.

The bend section 511 extends between two first stack sections 512 that are adjacent to each other. The bend section 511 is parallel to the first direction X, and the first direction X is perpendicular to the stacking direction Z. Specifically, the bend section 511 extends along a bending direction S shown in the drawing. The bending direction S may be understood as a direction parallel to the surface of the bend section 511. The bending direction S is perpendicular to the first direction X.

The guide portion 514 helps to improve the controllability and accuracy of the bend position, thereby making the first electrode plate 51 and the second electrode plate 52 less prone to deviate from the preset positions. The inventor further finds that the dimension of the guide portion 514 along the bending direction S directly affects the bend position of the first electrode plate 51.

Specifically, if the dimension of the guide portion 514 along the bending direction S is insufficient, the guiding effect of the guide portion 514 is limited during the bending and stacking of the first electrode plate 51. This increases the possibility of failure for the first electrode plate 51 to bend in the preset region, and makes the first stack section 512 prone to deviate from the preset position. An additional consequence is that the effect of the guide portion 514 in reducing the stress concentration of the first active material layer 51b of the bend section 511 is insignificant, and the bend section 511 is still prone to detachment of coating. The space provided by the guide portion 514 for the second stack section 522 and the separator 53 is insufficient, the extrusion force exerted by the bend section 511 on the second stack section 522 and the separator 53 is excessive, and the second stack section 522 is still prone to detachment of coating.

If the dimension of the guide portion 514 along the bending direction S is excessive, an easily bendable region of the first electrode plate 51 is oversized. This also increases the probability of failure for the first electrode plate 51 to bend in the preset region, makes the first stack section 512 prone to deviate from the preset position, and makes the electrode assembly 50 deform severely. In addition, if the dimension of the guide portion 514 along the bending direction S is excessive, the guide portion 514 may extend to a side of the second electrode plate 52 along the stacking direction Z. In this case, the guide portion 514 is unable to provide a lithium intercalation space for lithium ions deintercalated from the first electrode plate 51, resulting in risks of lithium plating.

In view of this, the inventor makes a further improvement to the structure of the first electrode plate 51. Specifically, in the stacking direction Z, the thickness of the first stack section 512 is Da, the thickness of the second stack section 522 is Dc, the thickness of the separation section 531 is Ds, and the dimension of the guide portion 514 in the bending direction S is w. w, Da, Dc, and Ds satisfy a relational expression: $Dc+2Ds \leq w \leq 2 \times (Dc+2Ds+Da)$. Optionally, the value of Da is 0.11 mm to 0.25 mm, the value of Dc is 0.16 mm to 0.3 mm, and the value of Ds is 0.009 mm to 0.02 mm.

Based on studies and tests, the inventor finds that, when the dimension w of the guide portion 514 satisfies the foregoing relational expression, the guide portion 514 can guide the first electrode plate 51 to bend in a preset region, thereby improving controllability and accuracy of the bend position, making the first electrode plate 51 and the second electrode plate 52 less prone to deviate from the preset positions, and suppressing lithium plating. In addition, the guide portion 514 can reduce stress concentration of the first active material layer 51b on the bend section 511, provide enough space for the second stack section 522 and the separator 53, reduce the extrusion force exerted by the bend section 511 on the second stack section 522 and the separator 53, and suppress detachment of coating.

In the bending direction S, the dimension of the bend section 511 is correlated with the dimension w of the guide portion 514. Specifically, in some examples, in the bending direction S, the dimension w of the guide portion 514 is equal to the dimension of the bend section 511. In other words, the bend section 511 and the first stack section 512 can be delineated according to an edge of the guide portion 514 in the bending direction S.

In some embodiments, the first electrode plate 51 is a negative electrode plate, and the second electrode plate 52 is a positive electrode plate. The first active material layer 51b of the bend section 511 can provide a lithium intercalation space for lithium ions, thereby reducing risks of lithium plating.

In some embodiments, in the stacking direction Z, the first active material layer 51b of the first stack section 512 fully covers the second active material layer 52b of the second stack section 522. Here, "fully cover" means that in a plane perpendicular to the stacking direction Z, an orthographic projection of the second active material layer 52b of the second stack section 522 fully falls within an orthographic projection of the first active material layer 51b of the first stack section 512. In this case, a projected area of the second active material layer 52b of the second stack section 522 is less than a projected area of the first active material layer 51b of the first stack section 512.

The first active material layer 51b of the first stack section 512 can provide a lithium intercalation space for the lithium ions deintercalated from the second active material layer 52b, thereby suppressing lithium plating.

In some embodiments, in a direction perpendicular to the stacking direction Z, the first active material layer 51b of the first stack section 512 exceeds the second active material layer of the second stack section 522 by at least 0.1 mm. Specifically, in the first direction X, the first active material layer 51b of the first stack section 512 exceeds the second active material layer of the second stack section 522 by at least 0.1 mm. In the second direction Y, the first active material layer 51b of the first stack section 512 exceeds the second active material layer of the second stack section 522 by at least 0.1 mm. The second direction Y is perpendicular to the first direction X and the stacking direction Z. In this case, the first active material layer 51b of the first stack section 512 can provide a sufficient lithium intercalation space for the lithium ions deintercalated from the second active material layer 52b, thereby suppressing lithium plating.

Figure 9:
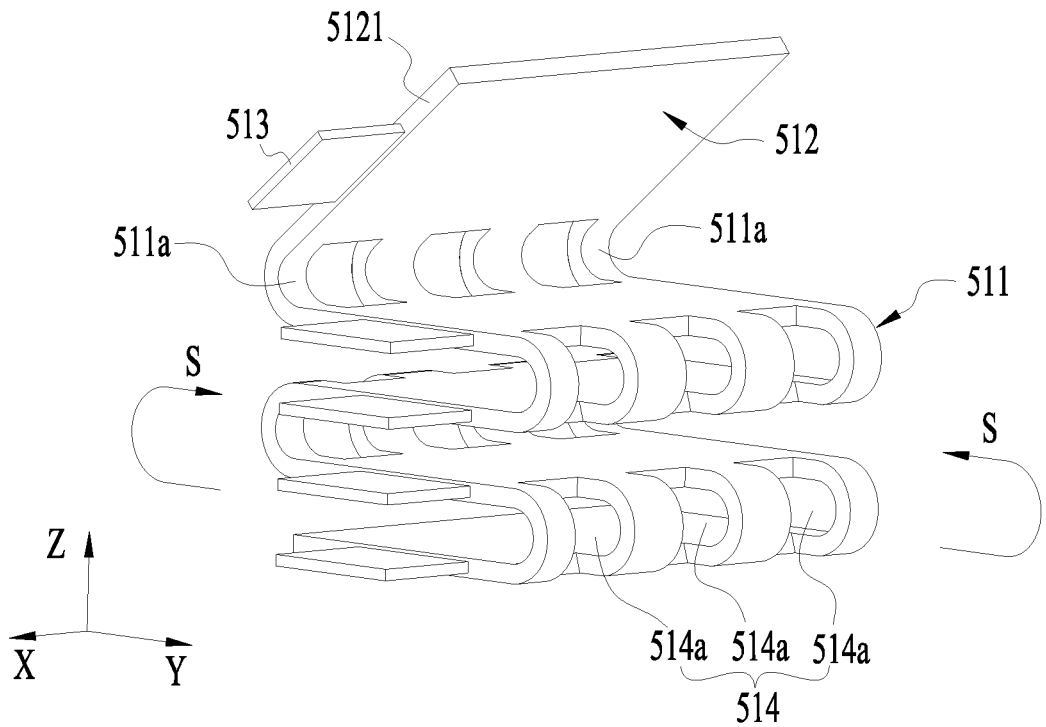
FIG. 9 is a schematic structural diagram of a first electrode plate of an electrode assembly when the first electrode plate is in a folded state according to an embodiment of this application.
Figure 10:
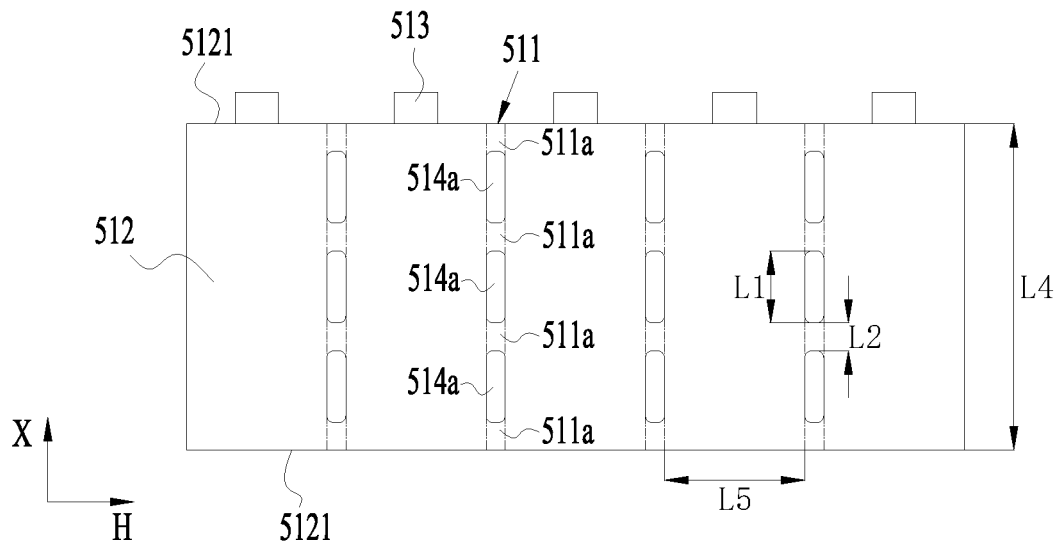
FIG. 10 is a schematic structural diagram of a first electrode plate of an electrode assembly when the first electrode plate is in an unfolded state according to an embodiment of this application.

FIG. 9 is a schematic structural diagram of a first electrode plate 51 of an electrode assembly 50 when the first electrode plate is in a folded state according to an embodiment of this application. FIG. 10 is a schematic structural diagram of a first electrode plate 51 of an electrode assembly 50 when the first electrode plate is in an unfolded state according to an embodiment of this application. The dashed line in FIG. 10 does not represent a physical structure, but schematically shows a division line between the bend section 511 and the first stack section 512.

When the first electrode plate 51 is in an unfolded state, the first electrode plate 51 extends along a length direction H of the first electrode plate, and the first stack sections 512 and the bend sections 511 are disposed alternately along the length direction H. Each bend section 511 connects two first stack sections 512 that are adjacent to each other. The dimension w of the guide portion 514 along the bending direction S when the first electrode plate 51 is in a folded state is the dimension of the guide portion 514 along the length direction H when the first electrode plate 51 is in the unfolded state. When the first electrode plate 51 is in the unfolded state, the first direction X is parallel to the width direction of the first electrode plate 51.

In some embodiments, the guide portion 514 includes at least one hole 514a. A part of material is removed from the bend section 511 to form the hole 514a on the bend section 511. The hole 514a can reduce strength of the bend section 511 and make the bend section 511 more bendable. With the hole 514a provided, at least a part of the first active material layer on the bend section 511 is removed, so as to reduce the stress concentration of the first active material layer on the bend section 511, provide space for the second stack section and the separator, reduce the extrusion force exerted by the bend section 511 on the second stack section and the separator, and suppress detachment of coating.

In some embodiments, the hole 514a may be a blind hole. In other words, the hole 514a is a groove that does not run through the bend section 511. In some examples, the hole 514a is recessed against a surface that is of the bend section 511 and that faces the second stack section. Optionally, the hole 514a is formed by removing a part of the first active material layer, and the hole 514a extends to the first current collector and exposes the first current collector.

In some embodiments, the hole 514a is a through-hole and runs through the bend section 511. The hole 514a runs through the first current collector of the bend section 511 and the first active material layers on both sides of the first current collector. The hole 514a may be formed by die-cutting the first electrode plate 51, so that the forming process is simple. The hole 514a that is through can reduce the stress concentration of the first active material layer on the bend section 511, provide sufficient space for the second stack section and the separator, reduce the extrusion force exerted by the bend section 511 on the second stack section and the separator, and suppress detachment of coating. In addition, the hole 514a that is through can reduce a weight of the electrode assembly and increase an energy density of the electrode assembly. An electrolytic solution may run through the hole 514a to infiltrate the second electrode plate, thereby improving effects of infiltrating the electrode assembly.

In some embodiments, the bend section 511 includes a plurality of bend sub-sections 511a. The bend sub-sections 511a and the holes 514a are disposed alternately along the first direction X. Each bend sub-section 511a connects two adjacent first stack sections 512. By increasing the number of bend sub-sections 511a, the dimension of the bend sub-sections 511a along the first direction X can be reduced, and each bend sub-section 511a is more bendable, thereby helping to guide the folding of the first electrode plate 51.

When the hole 514a is a through-hole, the plurality of bend sub-sections 511a are separated from each other. When the hole 514a is a blind hole, the bend section 511 further includes a connecting sub-section. The connecting sub-section is a bottom wall of the hole 514a. The connecting sub-section connects two adjacent bend sub-sections 511a.

In some embodiments, the dimension of the hole 514a along the first direction X is L1, and the dimension of the bend sub-section 511a along the first direction X is L2. The dimension of the first electrode plate 51 along the first direction X is constant. With a larger value of L1, the value of L2 is smaller, the bend sub-section 511a is more bendable, and accordingly, and the bend sub-section 511a is less strong and is more prone to break during the bending. Conversely, with a smaller value of L1, the value of L2 is larger, the bend sub-section 511a is less bendable, and the guidance effect of the bend sub-section 511a is worse. After comprehensively considering the bending effect and strength of the bend sub-section 511a and carrying out studies and tests, the inventor finds that when $2 \leq L1/L2 \leq 40$, the bending effect of the bend sub-section 511a is improved without breaking the bend sub-section 511a. Optionally, the value of the ratio of L1 to L2 is 10, 20, or 30.

In some embodiments, the guide portion 514 includes a plurality of holes 514a. The plurality of holes 514a are spaced out. Optionally, the plurality of holes 514a are spaced out along the first direction X. With the number of holes 514a increased, the number of the bend sub-sections 511a is increased accordingly, the dimension of the bend sub-sections 511a along the first direction X is reduced, and each bend sub-section 511a is more bendable, thereby helping to guide the folding of the first electrode plate 51.

In some embodiments, the hole 514a is in a circular, elliptical, racetrack, or polygonal shape. It is hereby noted that the shape is a shape of the hole 514a when the first electrode plate 51 is in an unfolded state. In some examples, the corners of the polygonal hole 514a are rounded corners. The rounded corners can smoothen the corners of the polygonal hole 514a, and reduce burrs on the first electrode plate 51 during formation of the hole 514a. For example, the hole 514a is approximately rectangular, with four corners being rounded. When the first electrode plate 51 is in the unfolded state, the dimension of the hole 514a along the first direction X is larger than the dimension of the hole 514a along the length direction H.

The dimension of the guide portion 514 along the first direction X is L3. Specifically, when the guide portion 514 includes only one hole 514a, L3 is equal to L1. When the guide portion 514 includes a plurality of holes 514a, L3 is equal to a sum of the dimensions L1 of the plurality of holes 514a along the first direction X.

The dimension of the bend section 511 along the first direction X is L4. The dimension L4 of the bend section 511 along the first direction X is equal to the dimension of the first stack section 512 along the first direction X. Each first stack section 512 includes two opposite first edges 5121. The first edges 5121 are located at two ends of the first stack section 512 along the first direction X. In the first direction X, a distance between the two first edges 5121 is equal to L4. When the first electrode plate 51 is in the unfolded state, the value of L4 is the width of the first electrode plate 51. The dimension L4 of the bend section 511 is equal to a sum of the dimensions L1 of all the holes 514a and the dimensions L2 of all the bend sub-sections 511a.

In some embodiments, with a higher ratio of L3 to L4, the bend section 511 is more bendable, the guidance effect is better, and the bend section 511 is more prone to break during the bending. Conversely, with a lower ratio of L3 to L4, the bend section 511 is less bendable, and the guidance effect is worse, and the bend section 511 is stronger and less prone to break during the bending. After comprehensively considering the bending effect and strength of the bend sub-section 511a and carrying out studies and tests, the inventor finds that when 0.5≤L3/L4≤0.99, the bending effect of the bend section 511 and the guidance effect of the guide portion are improved on the basis of reducing risks of breaking the bend section 511. Optionally, the value of the ratio of L3 to L4 is 0.6, 0.7, 0.8, or 0.9.

The smaller the value of L4, the lower the strength of the bend section 511. When the value of L4 is inefficient, the guidance effect of the guide portion 514 is insignificant. The larger the value of L4, the more difficult it is to ensure that both ends of the bend section 511 along the first direction X are bent simultaneously. After carrying out studies and tests, the inventor finds that when the dimension L4 of the bend section 511 is 200 mm to 1200 mm, the bending effect of the bend section 511 is better.

In some embodiments, the plurality of bend sections 511 include a first bend section and a second bend section. The first bend section and the second bend section are connected to two ends of the first stack section 512 along a second direction Y respectively. A spacing L5 between the guide portion 514 on the first bend section and the guide portion 514 on the second bend section along the second direction Y is 80 mm to 200 mm. The second direction Y is perpendicular to the first direction X and the stacking direction Z. When the first electrode plate 51 is in the unfolded state, the spacing between the guide portions 514 of two adjacent bend sections 511 along the length direction H of the first electrode plate 51 is L5. In some examples, the value of L5 is equal to the dimension of the first stack section 512 along the second direction Y.

During the folding of the first electrode plate 51, if a bend section 511 deviates slightly from the preset position unexpectedly, the first stack section 512 connected to the bend section 511 may be deflected. In this case, the first edge 5121 of the first stack section 512 is at an angle to the second direction Y The larger the value of L5, the greater the upper limit of deviation of the first edge 5121 from the preset position in the first direction X. With the capacity of the electrode assembly 50 being constant, the smaller the value of L5, the more layers the first electrode plate 51 is folded into, and the more prone the first stack section 512 is to deviate from the preset position. After carrying out studies and tests, the inventor finds that the value of L5 falling within 80 mm to 200 mm can improve the forming effect of the electrode assembly 50.

In some embodiments, after the first electrode plate 51 is bent under the guidance of the guide portion 514, the first edges 5121 of the two adjacent first stack sections 512 connected to the bend section 511 are consistent. In a plane perpendicular to the stacking direction Z, when the orthographic projections of the first edges 5121 on the same side of the two adjacent first stack sections 512 coincide, it is considered that the first edges 5121 of the two adjacent first stack sections 512 are consistent. However, due to process errors, in the plane perpendicular to the stacking direction Z, an angle may exist between the orthographic projections of the first edges 5121 of the two adjacent first stack sections 512. As long as the first active material layer 51b of the first stack section 512 in the stacking direction Z can fully cover the second active material layer 52b of the second stack section 522, it is considered that the first edges 5121 of the two adjacent first stack sections 512 is consistent. The angle is referred to as a tolerable error angle.

Figure 11:
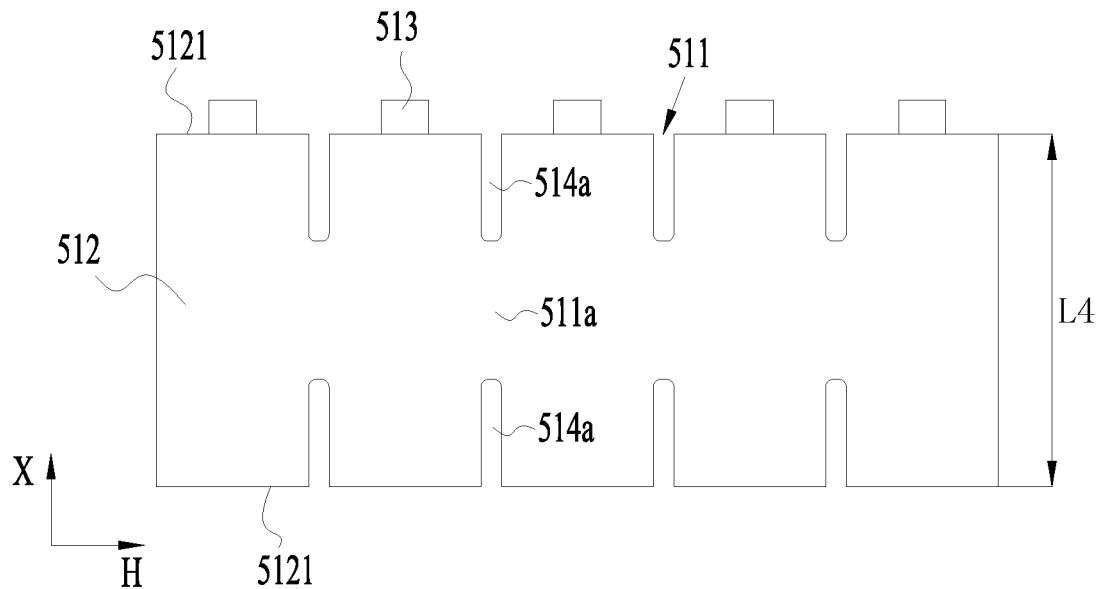
FIG. 11 is a schematic structural diagram of a first electrode plate of an electrode assembly when the first electrode plate is in an unfolded state according to another embodiment of this application.

FIG. 11 is a schematic structural diagram of a first electrode plate 51 of an electrode assembly 50 when the first electrode plate is in an unfolded state according to another embodiment of this application. As shown in FIG. 11, in some embodiments, the bend section 511 includes two holes 514a and one bend sub-section 511a. Each bend sub-section 511a connects two adjacent first stack sections 512. The two holes 514a are located on two sides of the bend sub-section 511a along the first direction X, respectively. Each hole 514a is opened at an end of the first electrode plate 51 along the first direction X. In some other embodiments, the bend section 511 may include just one hole 514a and one bend sub-section 511a. The hole 514a and the bend sub-section 511a are disposed along the first direction X.

The foregoing aspects of this application are described in more detail below with reference to examples. However, the examples are merely illustrative, and this application is not limited to the examples.

Preparing an Electrode Assembly

Example 1

(i) Using a negative active material that is graphite or a mixture of graphite and other active materials blended at a specific mass ratio, mixing the negative active material, acetylene black as a conductive agent, carboxymethyl cellulose (CMC) as a thickener, and styrene butadiene rubber (SBR) as a binder at a mass ratio of 96.4:1:1.2:1.4, adding deionized water as a solvent, and stirring the mixture system with a vacuum mixer until the system is homogeneous so as to obtain a negative slurry; coating a copper foil with the negative slurry evenly, air-drying the copper foil under a room temperature, moving the copper foil into an oven for further drying, and then performing cold pressing, slitting, and cutting to obtain a first electrode plate 51. Drying and curing the negative slurry to form a first active material layer 51*b*.

Figure 12:
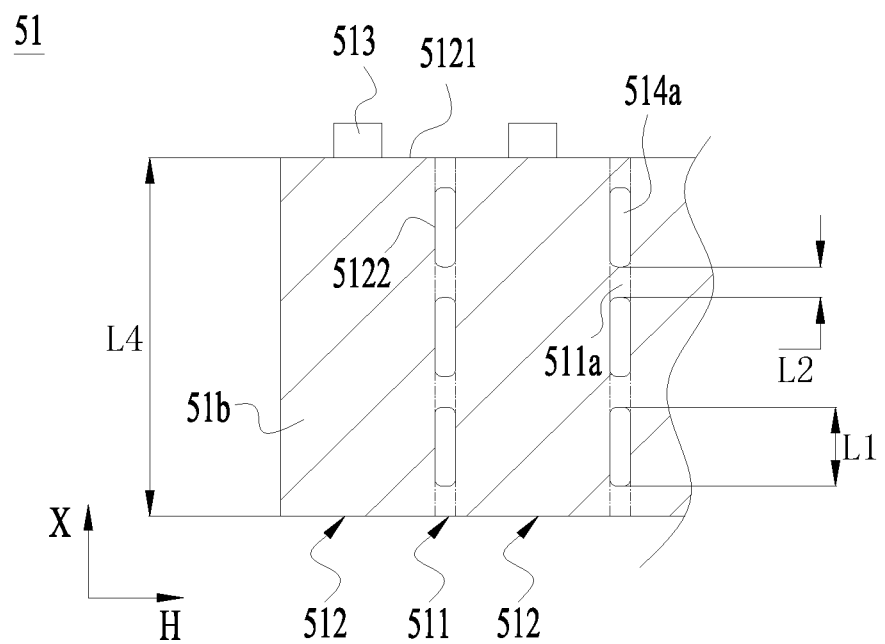
FIG. 12 to FIG. 16 are schematic diagrams of an electrode assembly in a formation process according to an embodiment of this application.

(ii) Forming a hole 514*a* on the first electrode plate 51 by using a laser or die-cutting tool. The hole 514*a* runs through the first electrode plate 51. FIG. 12 is a schematic diagram of a first electrode plate 51 after the hole 514*a* is formed. As shown in FIG. 12, the first electrode plate 51 includes first stack sections 512 and bend sections 511 that are disposed alternately along the length direction H. Each bend section 511 includes four bend sub-sections 511*a* and three holes 514*a*. The bend sub-sections 511*a* and the holes 514*a* are disposed alternately along the first direction X. The dimension L1 of each hole 514*a* along the first direction X is 160 mm, and the dimension L2 of each bend sub-section 511*a* along the first direction X is 20 mm. The dimension of the bend section 511 and the first stack section 512 separately along the first direction X is 560 mm. The dimension of the first stack section 512 in the length direction H of the first electrode plate 51 is 88 mm. The dimension w of the bend section 511, the bend sub-section 511*a*, and the hole 514*a* separately in the length direction H is 0.3 mm. The thickness Da of the first stack section 512 and the thickness of the bend section 511 are both 0.18 mm. The first stack section 512 includes two first edges 5121 disposed opposite to each other along the first direction X, and two second edges 5122 disposed opposite to each other along the length direction H. The hole 514*a* is disposed contiguous to the second edge 5122. The dashed line in FIG. 12 does not represent a physical structure, but may schematically show the second edge 5122 of the first stack section 512. The first edge 5121 and the second edge 5122 are also edges of the first active material layer 51*b*. The tab 513 extends from a first edge 5121. There are 41 first stack sections 512, and 40 bend sections 511.

Figure 13:
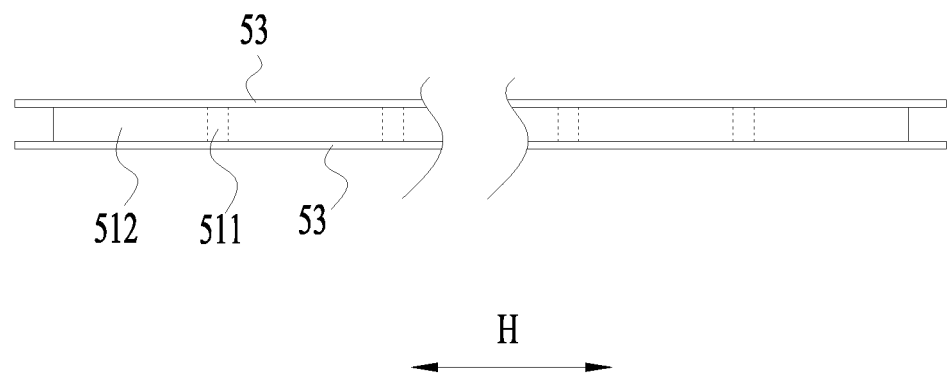

(iii) Providing two separators 53, and fixing the two separators 53 onto two surfaces of the first electrode plate 51 respectively. FIG. 13 is a schematic structural diagram of a first electrode plate 51 and a separator 53 that are fixed together. The separator 53 may be fixed to the first electrode plate 51 by hot pressing, electrophoresis, bonding, or the like. The separator 53 is a polyethylene film. The thickness Ds of the separator 53 is 0.01 mm.

(iv) Mixing NCM523 as a positive active material, acetylene black as a conductive agent, and polyvinylidene difluoride (PVDF) as a binder at a mass ratio of 96:2:2, adding N-methyl-pyrrolidone (NMP) as a solvent, and stirring the mixture system with a vacuum mixer until the system is homogeneous so as to obtain a positive slurry; mixing the PVDF as a binder, aluminum oxide as an insulating material, and the solvent together to prepare a protective slurry; coating an aluminum foil with the positive slurry and the protective slurry evenly, air-drying the aluminum foil under a room temperature, moving the aluminum foil into an oven for further drying, and then performing cold pressing, slitting, and cutting to obtain a second electrode plate 52. The positive slurry is cured to form a second active material layer 52*b*, and the protective slurry is cured to form a protective coating 52*c*.

Figure 14:
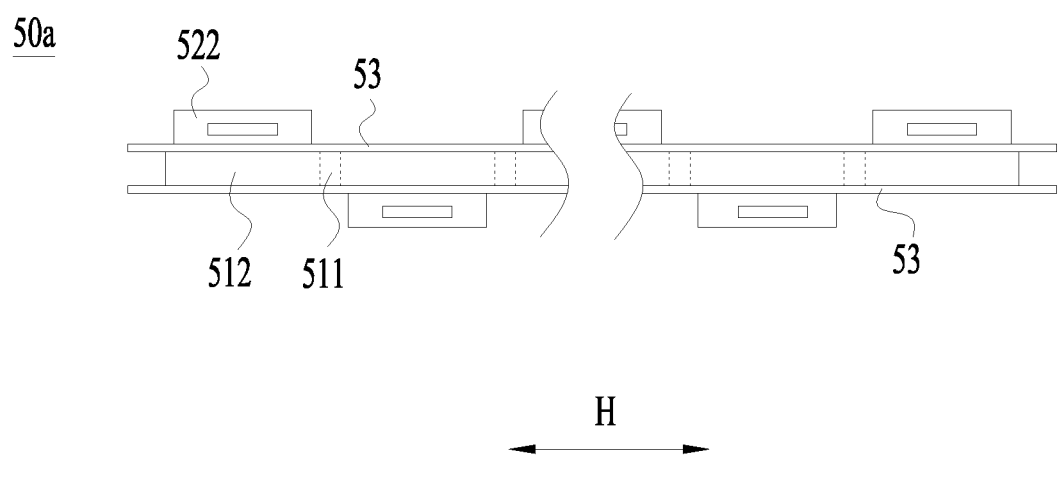
Figure 15:
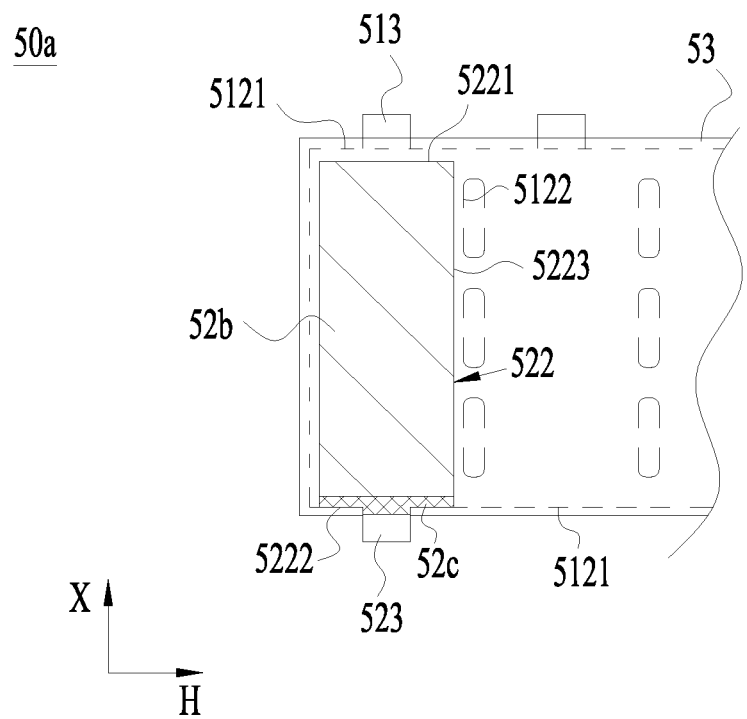

(v) Fixing a plurality of second electrode plates 52 onto the separators 53. FIG. 14 is a schematic diagram of a strip-shaped electrode assembly 50*a*, and shows a first electrode plate 51, a second electrode plate 52, and a separator 53 that are fixed together. For a plurality of second electrode plates 52, the second electrode plates 52 may be arranged in the manner shown in FIG. 14. Each second electrode plate 52 may be fixed to the separator 53 by hot pressing, electrophoresis, bonding, or the like. FIG. 15 is a partial schematic top view of a strip-shaped electrode assembly 50*a*, and shows a first electrode plate 51, a second electrode plate 52, and a separator 53 that are fixed together. As shown in FIG. 15, the second electrode plate 52 includes a second stack section 522 and a second tab 523 connected to the second stack section 522. The second stack section 522 includes a third edge 5221 and a fourth edge 5222 that are disposed opposite to each other along the first direction. The second tab 523 extends from the fourth edge 5222. Along the first direction X, the dimension of the second stack section 522 is 558.5 mm. Specifically, in the first direction X, one first edge 5121 of the first stack section 512 exceeds the third edge by 1.5 mm, and the other first edge 5121 of the first stack section 512 is flush with the fourth edge 5222. Along the first direction X, the dimension of a part that is of the protective coating 52*c* and that is located on the second stack section 522 is 1.5 mm. That is, in the first direction X, both first edges 5121 of the first stack section 512 exceed the second active material layer by 1.5 mm. The dimension of the second stack section 522 along the length direction H is 86 mm. The second stack section 522 includes two oppositely disposed fifth edges 5223 in the length direction H. In the length direction H, a distance between the fifth edge 5223 and the second edge 5122 of the first stack section 512 is 1 mm. The thickness Dc of the second stack section 522 is 0.25 mm. There are 40 second electrode plates 52.

Figure 16:
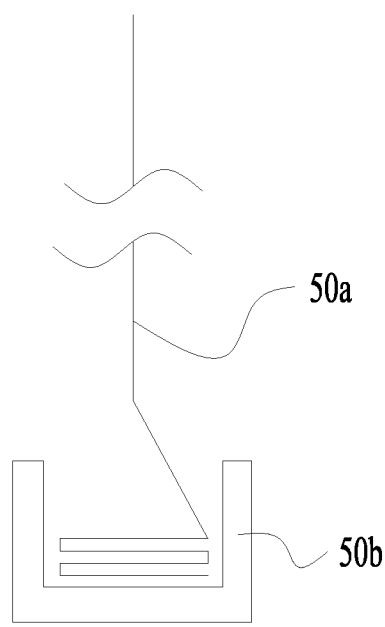

(vi) Folding the strip-shaped electrode assembly 50*a*. FIG. 16 is a schematic diagram of a strip-shaped electrode assembly 50*a* during folding. For example, the strip-shaped electrode assembly 50*a* may be pulled to the top of a forming die 50*b*. After entering a cavity of the forming die 50*b*, the strip-shaped electrode assembly 50*a* is folded under the action of gravity. Other auxiliary members may be used instead to assist in bending the strip-shaped electrode assembly 50*a*.

(vii) After completion of folding, hot-pressing the formed electrode assembly, and fixing the electrode assembly with adhesive tape.

Example 2: An electrode assembly is manufactured according to the same method as Example 1, except that the dimension w of the hole 514*a* in the length direction H is changed to 0.27 mm.

Example 3: An electrode assembly is manufactured according to the same method as Example 1, except that the dimension w of the hole 514*a* in the length direction H is changed to 0.4 mm.

Example 4: An electrode assembly is manufactured according to the same method as Example 1, except that the dimension w of the hole 514*a* in the length direction H is changed to 0.5 mm.

Example 5: An electrode assembly is manufactured according to the same method as Example 1, except that the dimension w of the hole 514*a* in the length direction H is changed to 0.6 mm.

Example 6: An electrode assembly is manufactured according to the same method as Example 1, except that the dimension w of the hole 514*a* in the length direction H is changed to 0.7 mm.

Example 7: An electrode assembly is manufactured according to the same method as Example 1, except that the dimension w of the hole 514*a* in the length direction H is changed to 0.8 mm.

Example 8: An electrode assembly is manufactured according to the same method as Example 1, except that the dimension w of the hole 514*a* in the length direction H is changed to 0.9 mm.

Comparative Example 1: An electrode assembly is manufactured according to the same method as Example 1, except that the dimension w of the hole 514*a* in the length direction H is changed to 0.1 mm.

Comparative Example 2: An electrode assembly is manufactured according to the same method as Example 1, except that the dimension w of the hole 514*a* in the length direction H is changed to 0.2 mm.

Comparative Example 3: An electrode assembly is manufactured according to the same method as Example 1, except that the dimension w of the hole 514*a* in the length direction H is changed to 1 mm.

Comparative Example 4: An electrode assembly is manufactured according to the same method as Example 1, except that the dimension w of the hole 514*a* in the length direction H is changed to 1.2 mm.

Evaluating Examples: Evaluating a relative position between the edge of the first stack section and the edge of the second stack section.

Manufacturing electrode assemblies according to Examples 1 to 8 and Comparative Examples 1 to 4, and evaluating the electrode assemblies.

Inspecting the position of each edge of the first stack section and the position of each edge of the second stack section in Examples 1 to 8 and Comparative Examples 1 to 4 by using an X-ray CT scanner.

Figure 17:
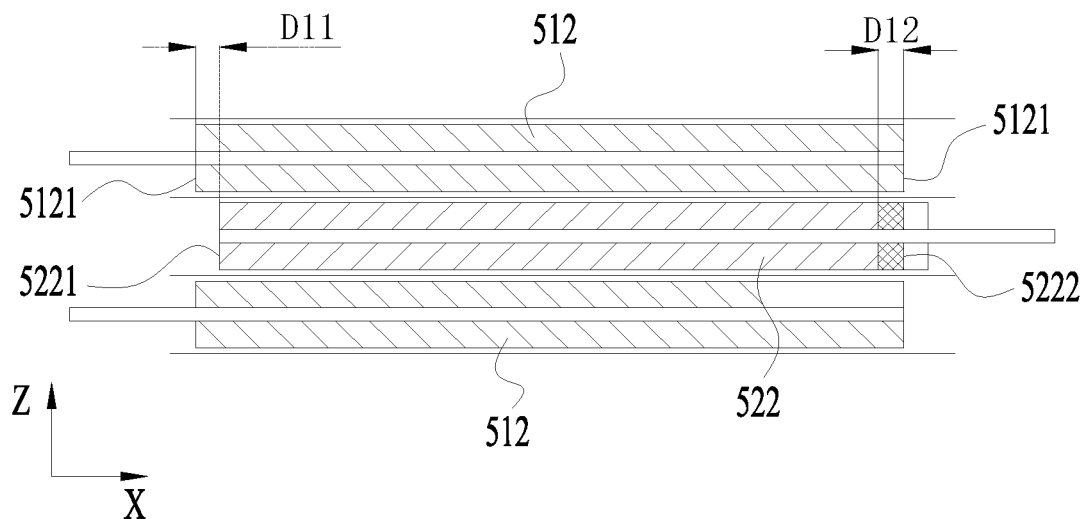
FIG. 17 is a partial schematic sectional view of an electrode assembly according to an embodiment of this application.

FIG. 17 is a partial schematic sectional view of an electrode assembly according to an embodiment of this application. As shown in FIG. 17, a minimum spacing D11 between the third edge 5221 of each second stack section 522 and one first edge 5121 of a corresponding first stack section 512 in the first direction X is calculated according to images detected by the scanner. D11 is the dimension by which one edge of the first active material layer exceeds one edge of the second active material layer in the first direction X. Each second stack section 522 is compared with the first stack sections 512 on both sides of the second stack section to obtain 80 values.

A minimum spacing D12*a* between the fourth edge 5222 of each second stack section 522 and another first edge 5121 of the corresponding first stack section 512 in the first direction X is calculated according to images detected by the scanner. D12*a* plus 1.5 mm is the dimension D12 by which the other edge of the first active material layer exceeds the other edge of the second active material layer in the first direction X. Each second stack section 522 is compared with the first stack sections 512 on both sides of the second stack section to obtain 80 values.

Figure 18:
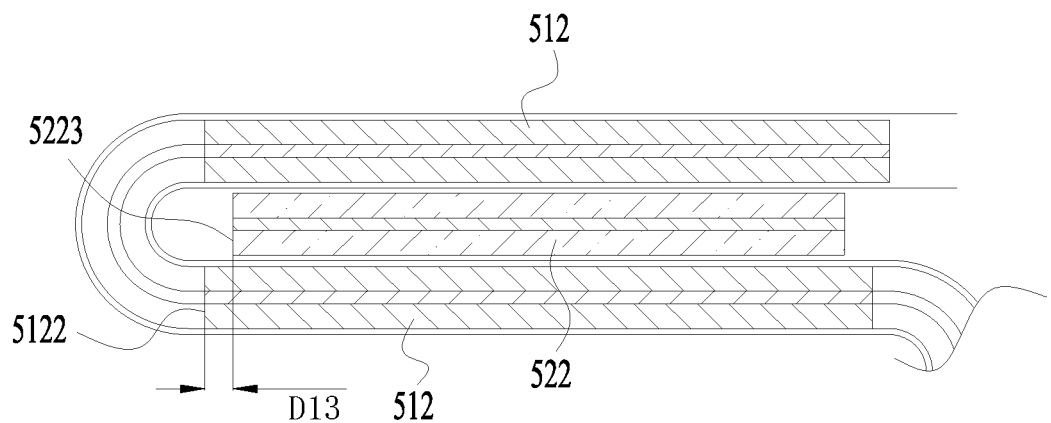
FIG. 18 is a partial schematic sectional view of an electrode assembly according to an embodiment of this application.

FIG. 18 is another partial schematic sectional view of an electrode assembly according to an embodiment of this application. As shown in FIG. 18, a minimum spacing D13 between the fifth edge 5223 of each second stack section 522 and the second edge 5122 of the corresponding first stack section 512 in the first direction X is calculated according to images detected by the scanner. Each second stack section 522 is compared with the first stack sections 512 on both sides of the second stack section to obtain 160 values.

A positive value of D11 means that an edge of the first active material layer exceeds an edge of the second active material layer in the first direction X. A negative value of D11 means that an edge of the second active material layer exceeds an edge of the first active material layer in the first direction X. It is the same with D12 and D13.

Table 1 shows evaluation results of Examples 1 to 8 and Comparative Examples 1 to 4.

TABLE 1

|  | w | Minimum value of D11 | Minimum value of D12 | Minimum value of D13 |
| --- | --- | --- | --- | --- |
| Example 1 | 0.3 mm | 0.23 mm | 0.25 mm | 0.68 mm |
| Example 2 | 0.27 mm | 0.19 mm | 0.20 mm | 0.70 mm |
| Example 3 | 0.4 mm | 0.37 mm | 0.35 mm | 0.61 mm |
| Example 4 | 0.5 mm | 0.54 mm | 0.56 mm | 0.52 mm |
| Example 5 | 0.6 mm | 0.76 mm | 0.71 mm | 0.45 mm |
| Example 6 | 0.7 mm | 0.56 mm | 0.53 mm | 0.34 mm |
| Example 7 | 0.8 mm | 0.33 mm | 0.34 mm | 0.26 mm |
| Example 8 | 0.9 mm | 0.20 mm | 0.22 mm | 0.20 mm |
| Comparative Example 1 | 0.1 mm | −0.03 mm | −0.01 mm | 0.81 mm |
| Comparative Example 2 | 0.2 mm | 0.09 mm | 0.07 mm | 0.74 mm |
| Comparative Example 3 | 1.0 mm | 0.08 mm | 0.09 mm | 0.09 mm |
| Comparative Example 4 | 1.2 mm | −0.01 mm | −0.02 mm | −0.03 mm |

As shown in Table 1, for the electrode assemblies in Examples 1 to 8, the value of w falls within 0.27 mm to 0.9 mm, and satisfies the relational expression Dc+2Ds≤w≤2×(Dc+2Ds+Da). In addition, the first active material layer of the first stack section can exceed the second active material layer of the second stack section by a preset dimension. The first active material layer of the first stack section can fully cover the second active material layer of the second stack section, thereby providing a sufficient lithium intercalation space for lithium ions and reducing phenomena of lithium plating. However, in Comparative Examples 1 to 4, the value of w is excessive or deficient. A possible consequence is that the first active material layer of the first stack section is unable to exceed the second active material layer of the second stack section, or the dimension by which the first active material layer of the first stack section exceeds the second active material layer of the second stack section is deficient. Compared with Examples 1 to 8, the electrode assemblies in Comparative Examples 1 to 4 are more prone to lithium plating. Therefore, compared with the electrode assemblies in Comparative Examples 1 to 4, the electrode assemblies in Examples 1 to 8 possess higher electrochemical performance and higher safety.

Figure 19:
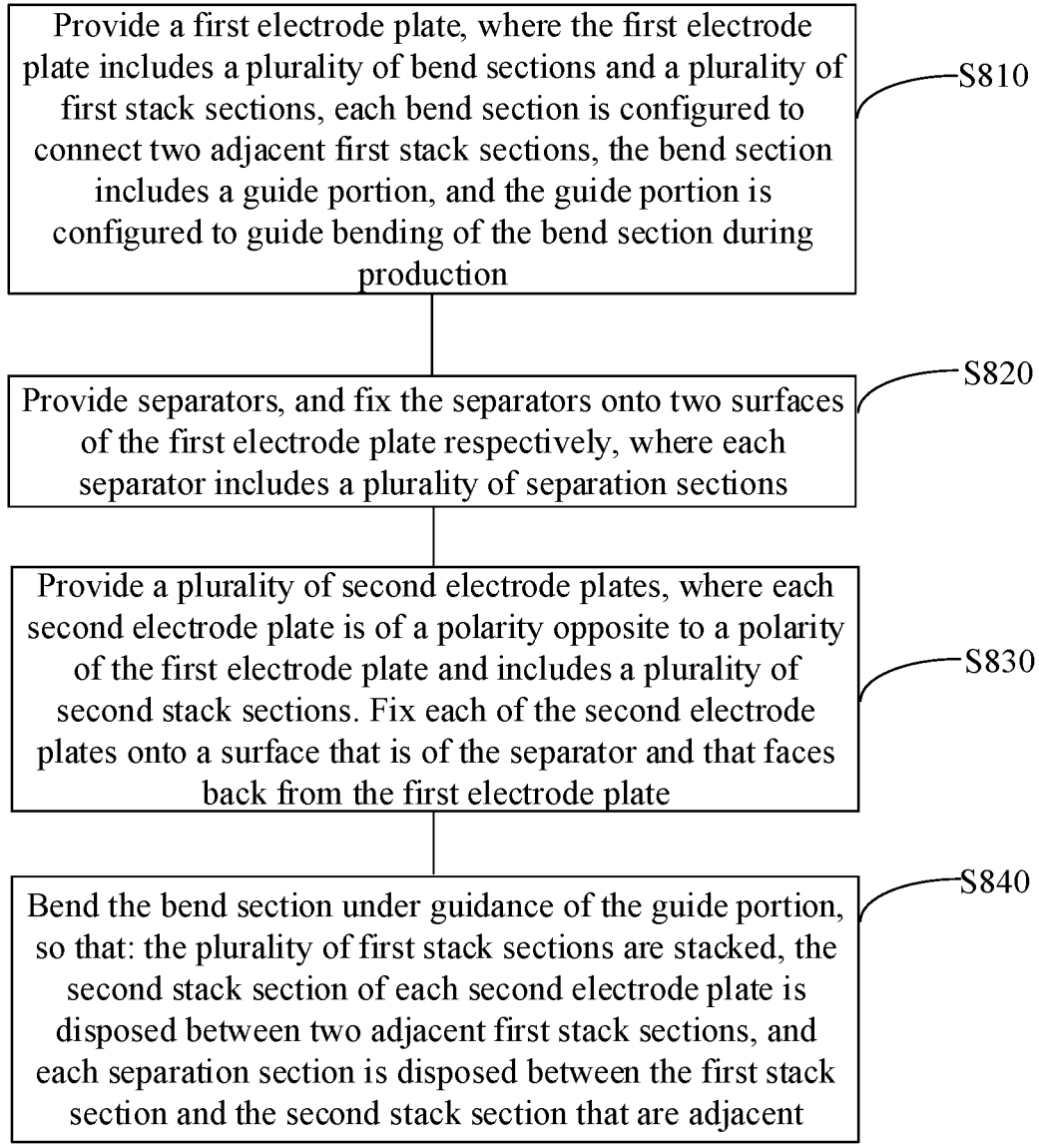
FIG. 19 is a schematic flowchart of a method for manufacturing an electrode assembly according to an embodiment of this application.

FIG. 19 is a schematic flowchart of a method for manufacturing an electrode assembly according to an embodiment of this application. As shown in FIG. 19, the manufacturing method includes the following steps:

S810: Provide a first electrode plate, where the first electrode plate includes a plurality of bend sections and a plurality of first stack sections, each bend section is configured to connect two adjacent first stack sections, the bend section includes a guide portion, and the guide portion is configured to guide bending of the bend section during production;

S820: Provide separators, and fix the separators onto two surfaces of the first electrode plate respectively, where each separator includes a plurality of separation sections;

S830: Provide a plurality of second electrode plates, where each second electrode plate is of a polarity opposite to a polarity of the first electrode plate and includes a second stack section. Fix each of the second electrode plates onto a surface that is of the separator and that faces away from the first electrode plate; and S840: Bend the bend section under guidance of the guide portion, so that: the plurality of first stack sections are stacked, the second stack section of each second electrode plate is disposed between two adjacent first stack sections, and each separation section is disposed between the first stack section and the second stack section that are adjacent. In a stacking direction of the plurality of the first stack sections, a thickness of each first stack section is Da, a thickness of the second stack section is Dc, a thickness of each separation section is Ds, a dimension of the guide portion in a bending direction of the bend section is w, and w, Da, Dc, and Ds satisfy a relational expression: $Dc+2Ds \leq w \leq 2\times(Dc+2Ds+Da)$.

For the related structures of the electrode assemblies manufactured according to the manufacturing method of this embodiment, refer to the related content of the electrode assemblies described in the foregoing embodiments corresponding to FIG. 1 to FIG. 18, details of which are omitted here.

Figure 20:
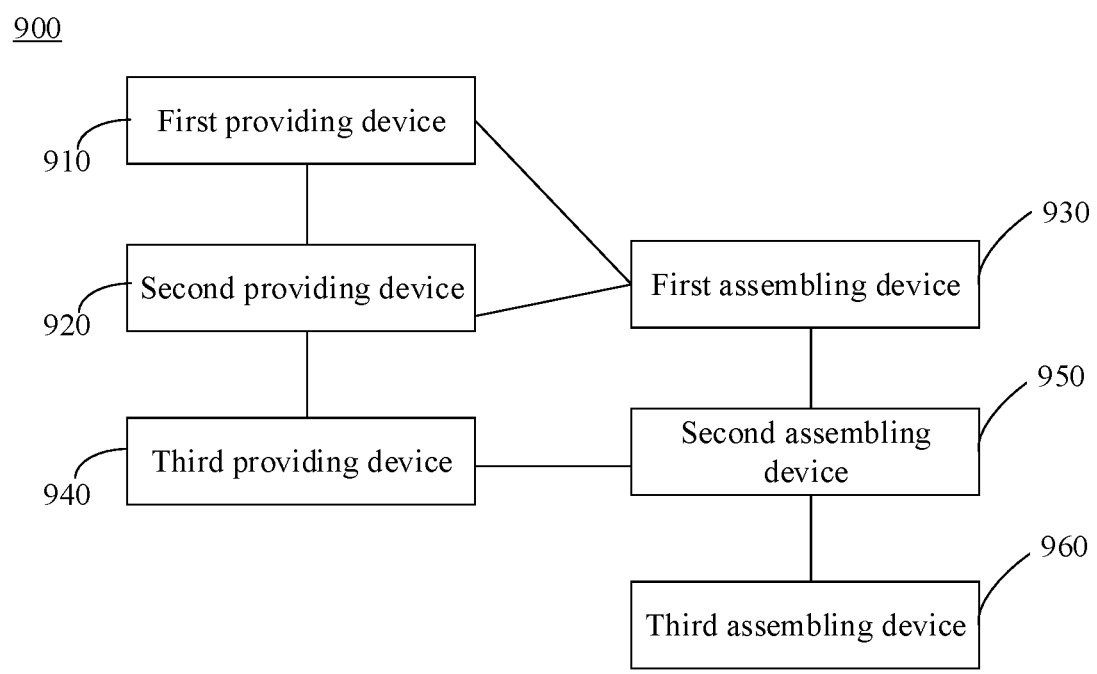
FIG. 20 is a schematic block diagram of a system for manufacturing a battery cell according to an embodiment of this application.

FIG. 20 is a schematic block diagram of a system for manufacturing a battery cell according to an embodiment of this application. As shown in FIG. 20, the manufacturing system 900 includes a first providing device 910, a second providing device 920, a first assembling device 930, a third providing device 940, a second assembling device 950, and a third assembling device 960. The first providing device 910 is configured to provide a first electrode plate. The first electrode plate includes a plurality of bend sections and a plurality of first stack sections. Each bend section is configured to connect two adjacent first stack sections. The bend section includes a guide portion, and the guide portion is configured to guide bending of the bend section during production. The second providing device 920 is configured to provide separators, where each separator includes a plurality of separation sections. The first assembling device 930 is configured to fix the separators onto two surfaces of the first electrode plate respectively. The third providing device 940 is configured to provide a plurality of second electrode plates. Each second electrode plate is of a polarity opposite to a polarity of the first electrode plate and includes a second stack section. The second assembling device 950 is configured to fix each of the second electrode plates onto a surface that is of the separator and that faces away from the first electrode plate. The third assembling device 960 is configured to bend the bend section under guidance of the guide portion, so that: the plurality of first stack sections are stacked, the second stack section of each second electrode plate is disposed between two adjacent first stack sections, and each separation section is disposed between the first stack section and the second stack section that are adjacent. In a stacking direction of the plurality of the first stack sections, a thickness of each first stack section is Da, a thickness of the second stack section is Dc, a thickness of each separation section is Ds, a dimension of the guide portion in a bending direction of the bend section is w, and w, Da, Dc, and Ds satisfy a relational expression: $Dc+2Ds \leq w \leq 2\times(Dc+2Ds+Da)$.

For the related structures of the electrode assemblies manufactured by using the manufacturing system of this embodiment, refer to the related content of the electrode assemblies described in the foregoing embodiments corresponding to FIG. 1 to FIG. 18, details of which are omitted here.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

What is claimed is:

1. An electrode assembly, comprising:
a first electrode plate, comprising two first stack sections that are stacked and a bend section configured to connect the first stack sections, the bend section comprising:
a guide portion configured to guide the bend section to bend during production; and
a bend sub-section comprising:
an arc region bent in an arc shape; and
two straight regions each being in a flat plate shape, one of the two straight regions being connected to the arc region and one of the first stack sections, and another one of the two straight regions being connected to the arc region and another one of the first stack sections;
a second electrode plate, the second electrode plate being of a polarity opposite to a polarity of the first electrode plate and comprising a second stack section disposed between the first stack sections; and
a separator, configured to separate the first electrode plate from the second electrode plate, the separator comprising two separation sections each disposed between the second stack section and one of the first stack sections;
wherein:
a thickness Da of each of the first stack sections in a stacking direction of the two first stack sections, a thickness Dc of the second stack section in the stacking direction, a thickness Ds of each of the separation sections in the stacking direction, and a dimension of the guide portion in a bending direction of the bend section w satisfy: $Dc+2Ds \leq w \leq 2\times(Dc+2Ds+Da)$; and
the guide portion comprises two holes located on two sides of the bend sub-section along a first direction, respectively, each of the two holes is opened at an end of the first electrode plate along the first direction, and the first direction is perpendicular to the bending direction of the bend section.

2. The electrode assembly according to claim 1, wherein the guide portion is disposed along the first direction.

3. The electrode assembly according to claim 1, wherein a dimension L1 of each of the holes along the first direction and a dimension L2 of the bend sub-section sub sections along the first direction satisfy: $2 \leq L1/L2 \leq 40$.

4. The electrode assembly according to claim 1, wherein each of the two holes is in a circular, elliptical, racetrack, or polygonal shape.

5. The electrode assembly according to claim 1, wherein a dimension L3 of the guide portion along the first direction and a dimension L4 of the bend section along the first direction satisfy: $0.5 \leq L3/L4 \leq 0.99$.

6. The electrode assembly according to claim 5, wherein the dimension L4 of the bend section along the first direction is 200 mm to 1200 mm.

7. The electrode assembly according to claim 1, wherein:
the bend section is one of a plurality of bend sections comprising a first bend section and a second bend section, the first bend section and the second bend section being connected to two ends, respectively, of one of the first stack section along a second direction;
a spacing between the guide portion of the first bend section and the guide portion of the second bend section along the second direction is 80 mm to 200 mm, and the second direction is perpendicular to the first direction and the stacking direction.

8. The electrode assembly according to claim 1, wherein:
the first electrode plate comprises a first current collector and a first active material layer disposed at a surface of the first current collector;
the second electrode plate comprises a second current collector and a second active material layer disposed at a surface of the second current collector; and
in the stacking direction, the first active material layer of one of the first stack sections fully covers the second active material layer of the second stack section.

9. The electrode assembly according to claim 8, wherein, in a direction perpendicular to the stacking direction, the first active material layer of the one of the first stack sections exceeds the second active material layer of the second stack section by at least 0.1 mm.

10. The electrode assembly according to claim 1, wherein:
each of the first stack sections comprises two opposite edges; and
after the bend section is bent as guided during production, the edges of the two first stack sections are consistent.

11. A battery cell, comprising:
a housing, provided with an accommodation cavity and an opening;
an electrode assembly accommodated in the accommodation cavity, the electrode assembly comprising:
  a first electrode plate, comprising two first stack sections that are stacked and a bend section configured to connect the first stack sections, the bend section comprising:
    a guide portion configured to guide the bend section to bend during production; and
    a bend sub-section comprising:
      an arc region bent in an arc shape; and
      two straight regions each being in a flat plate shape, one of the two straight regions being connected to the arc region and one of the first stack sections, and another one of the two straight regions being connected to the arc region and another one of the first stack sections;
  a second electrode plate, the second electrode plate being of a polarity opposite to a polarity of the first electrode plate and comprising a second stack section disposed between the first stack sections; and
  a separator, configured to separate the first electrode plate from the second electrode plate, the separator comprising two separation sections each disposed between the second stack section and one of the first stack sections; and
a cover plate, configured to close the opening of the housing;

wherein:
  a thickness Da of each of the first stack sections in a stacking direction of the two first stack sections, a thickness Dc of the second stack section in the stacking direction, a thickness Ds of each of the separation sections in the stacking direction, and a dimension of the guide portion in a bending direction of the bend section w satisfy: $Dc+2Ds \leq w \leq 2\times(Dc+2Ds+Da)$; and
  the guide portion comprises two holes located on two sides of the bend sub-section along a first direction, respectively, each of the two holes is opened at an end of the first electrode plate along the first direction, and the first direction is perpendicular to the bending direction of the bend section.

12. A battery, comprising:
a box; and
the battery cell according to claim 11, the battery cell being accommodated in the box.

13. An electrical device, comprising the battery according to claim 12, the battery being configured to provide electrical energy to the electrical device.

14. A method for manufacturing the electrode assembly according to claim 1, comprising:
providing the first electrode plate, the second electrode plate, and the separator;
fixing the separator onto two surfaces of the first electrode plate;
fixing the second electrode plate onto a surface of the separator, the surface of the separator facing away from the first electrode plate; and
bending the bend section of the first electrode plate under guidance of the guide portion, so that:
  the two first stack sections are stacked,
  the second stack section of the second electrode plate is disposed between the two first stack sections, and
  each of the separation sections is disposed between the second stack section and one of the first stack sections.

15. An electrode assembly, comprising:
a first electrode plate, comprising two first stack sections that are stacked and a bend section configured to connect the first stack sections, the bend section comprising:
  a guide portion configured to guide the bend section to bend during production;
  an arc region bent in an arc shape; and
  two straight regions each being in a flat plate shape, one of the two straight regions being connected to the arc region and one of the first stack sections, and another one of the two straight regions being connected to the arc region and another one of the first stack sections;
a second electrode plate, the second electrode plate being of a polarity opposite to a polarity of the first electrode plate and comprising a second stack section disposed between the first stack sections; and
a separator, configured to separate the first electrode plate from the second electrode plate, the separator comprising two separation sections each disposed between the second stack section and one of the first stack sections;
wherein:
  a thickness Da of each of the first stack sections in a stacking direction of the two first stack sections, a thickness Dc of the second stack section in the stacking direction, a thickness Ds of each of the separation sections in the stacking direction, and a dimension of the guide portion in a bending direction of the bend section w satisfy: $Dc+2Ds \leq w \leq 2\times(Dc+2Ds+Da)$; and the guide portion comprises a polygonal hole with rounded corners.

\* \* \* \* \*